April 19, 1955  R. H. SCHUMAN  2,706,544
MACHINE TOOL DRIVE
Filed June 30, 1950  7 Sheets-Sheet 2

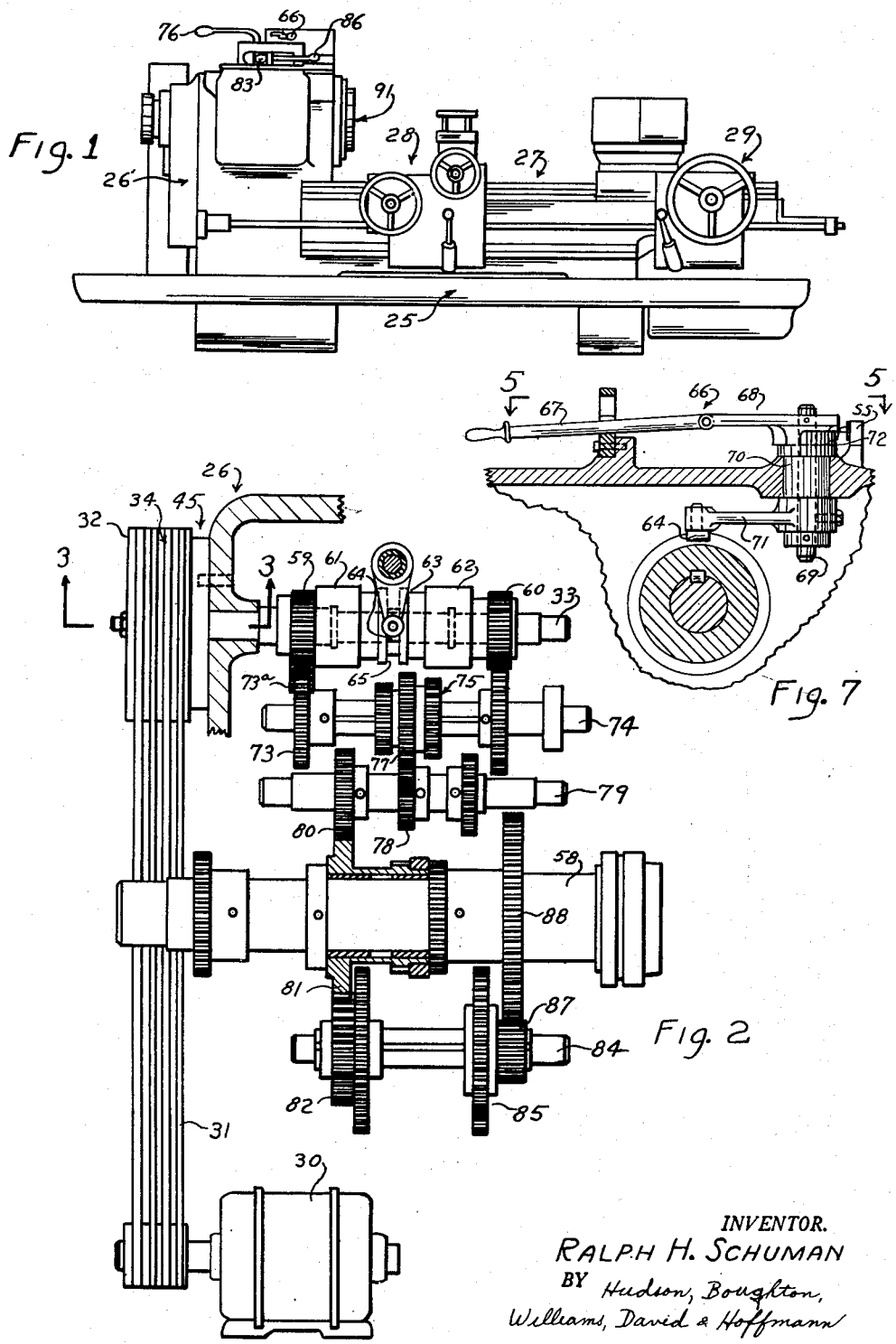

INVENTOR.
RALPH H. SCHUMAN
BY Hudson, Boughton
Williams, David & Hoffmann
ATTORNEYS

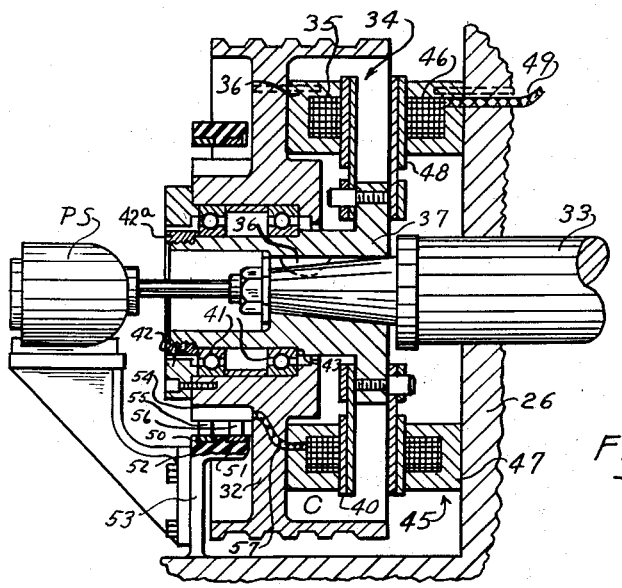

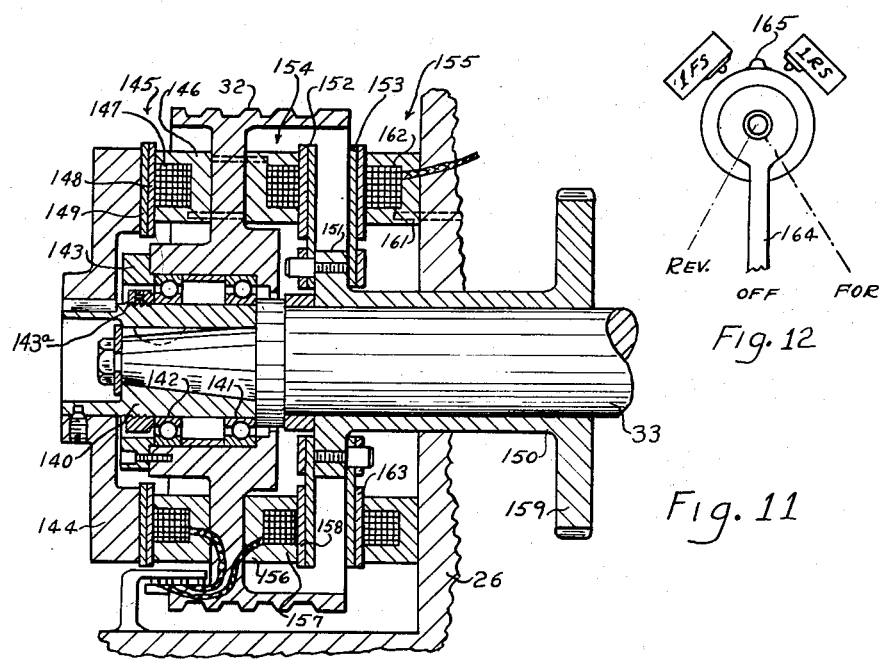
Fig. 11
Fig. 12
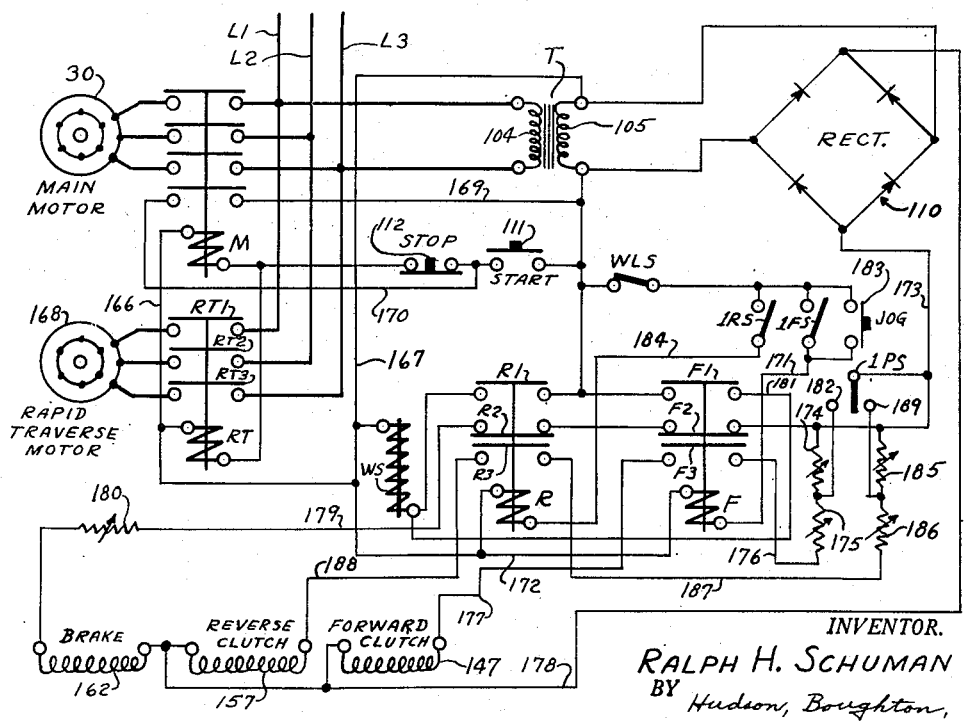
Fig. 13

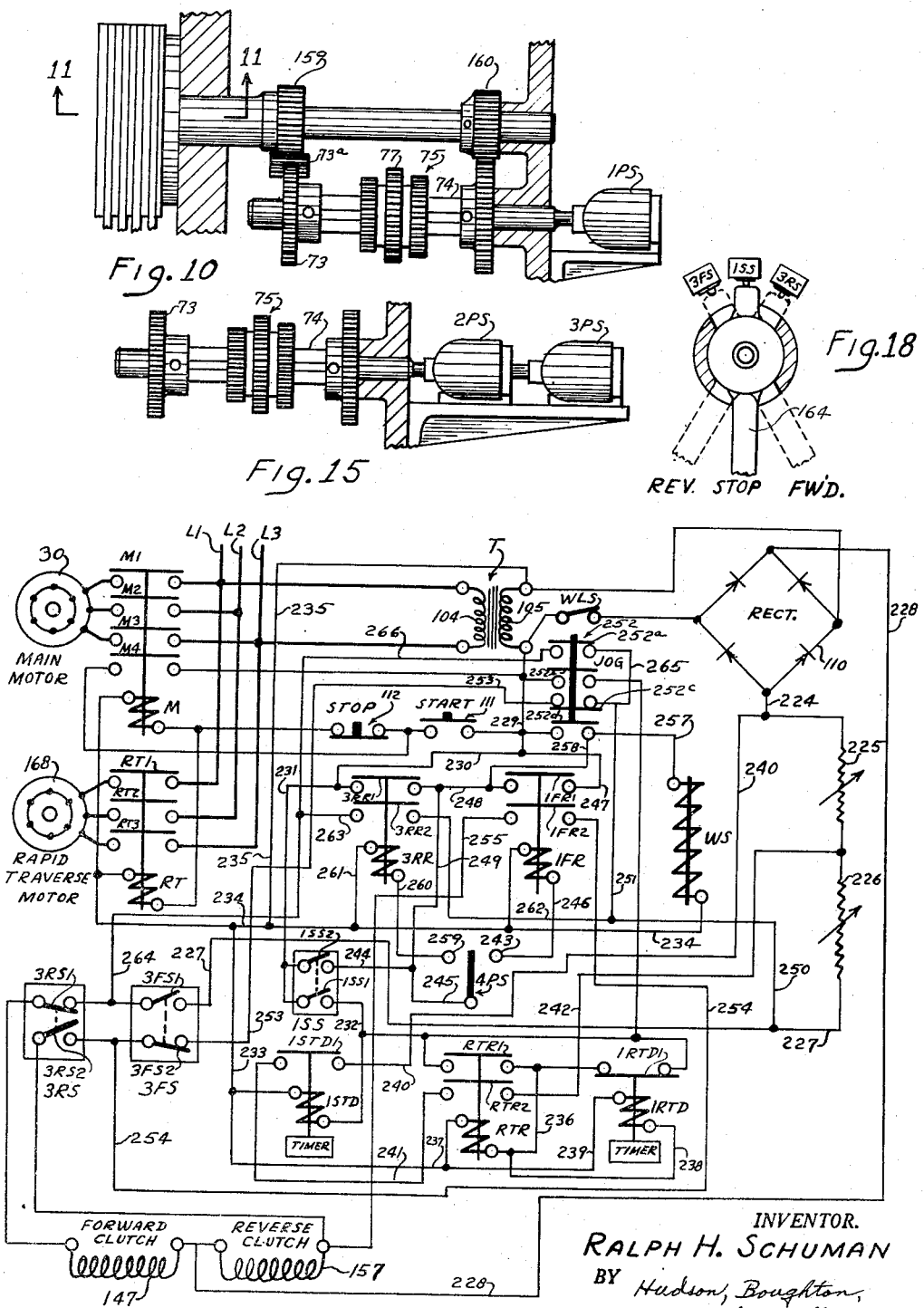

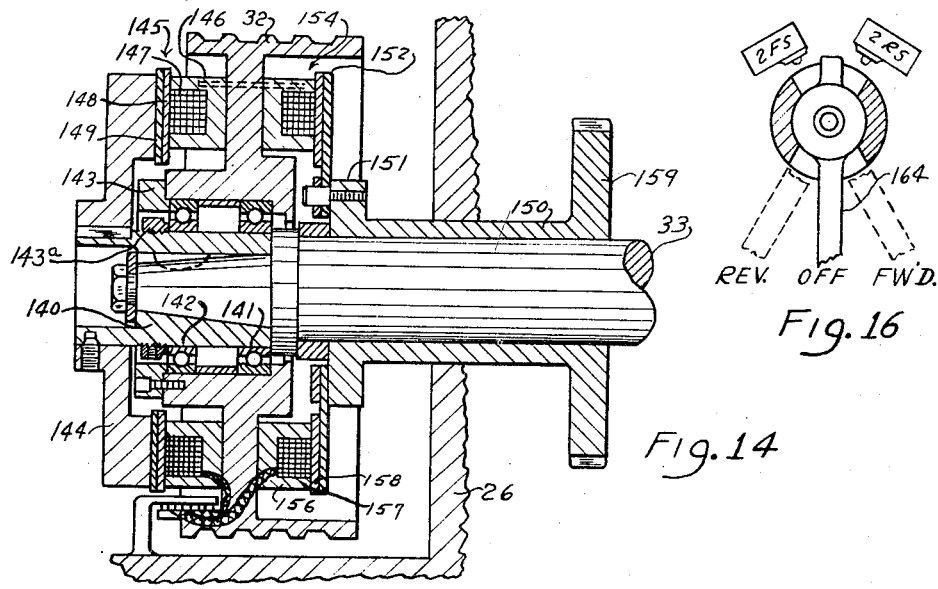
Fig. 14
Fig. 16
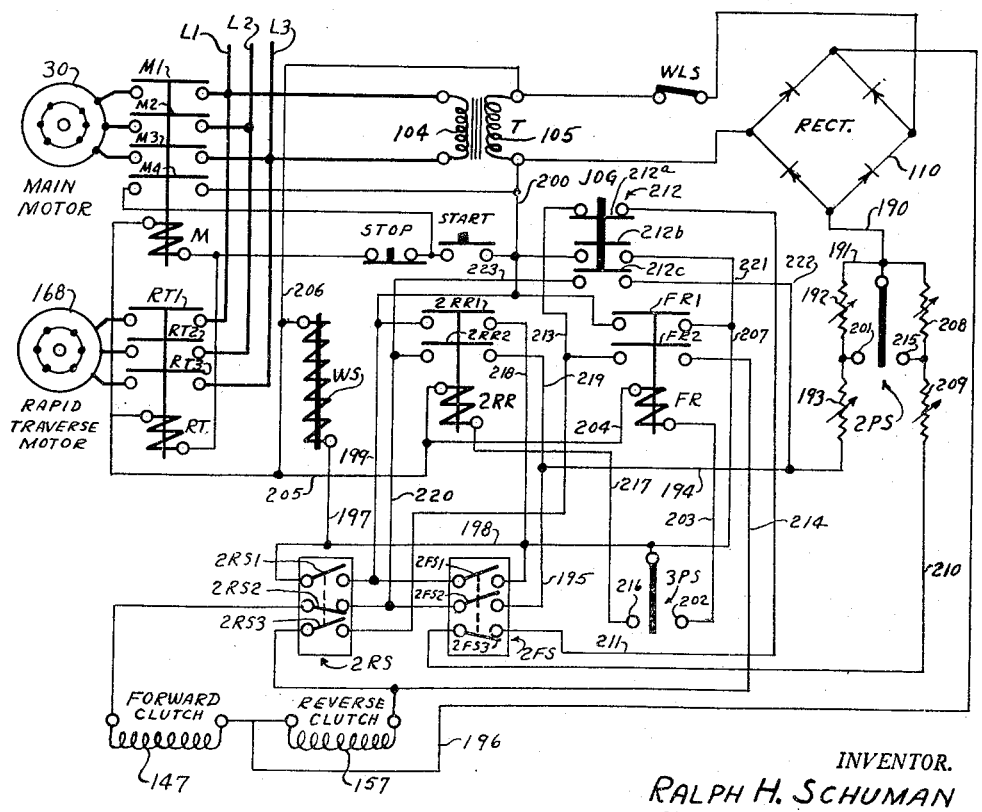
Fig. 17

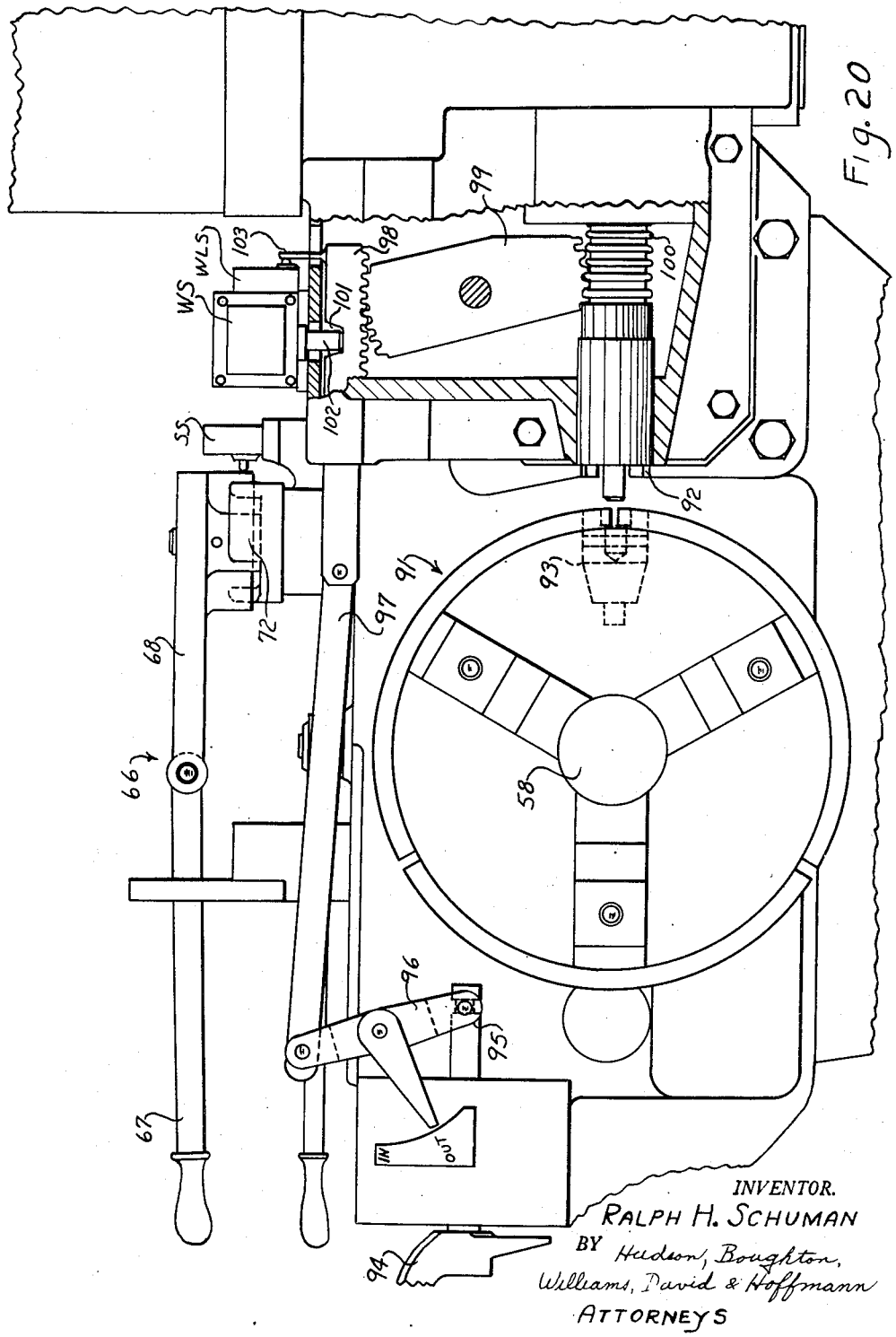

United States Patent Office 2,706,544
Patented Apr. 19, 1955

2,706,544

MACHINE TOOL DRIVE

Ralph H. Schuman, Cleveland, Ohio, assignor to The Warner & Swasey Company, Cleveland, Ohio, a corporation of Ohio Application June 30, 1950, Serial No. 171,493

28 Claims. (Cl. 192—3.5)

This invention relates to machine tools and, more particularly, to an improved means for controlling the rotation of the drive shaft of a machine tool.

The current trend in machine tool design is towards greater simplification of the controls and more automatic operation in an effort to reduce the lost or unproductive time of the apparatus as represented by the time required to shift from one operation to another, either when machining a workpiece necessitating diverse type operations or when operating upon a plurality of workpieces of different natures. One important manner in which such lost or unproductive time may be reduced is in increasing the relative ease and speed with which the machine may be brought to operating speed and the direction of rotation of the spindle or other driven shafts reversed. This in turn depends upon the nature of the clutches and/or brakes employed and hence in order to improve the characteristics of machine tools various proposals have been made with respect to the nature and operation of the clutches utilized in driving the spindle or other driven members of machine tools.

An object of this invention is the provision of an improved machine tool drive employing electromagnetic means controlled in a novel manner to facilitate starting, stopping and/or reversal of the driven parts or members such as the tool or work spindle and the like.

Another object of the invention is the provision of an improved driving means for a machine tool employing electromagnetic clutches of the variable torque type together with a means for adjusting the maximum torque transmitting capacity thereof and a means for initially reducing the torque transmitting capacity during starting and/or reversal, the last-mentioned means being automatically rendered ineffective by a delayed acting means so that the driven member may be brought substantially up to its operating speed under existing torque loads without damage to the clutches.

A further object of the invention is the provision of an improved driving means for a machine tool employing electromagnetic variable torque clutches and/or brakes for controlling the transmission of power together with control mechanism operated by a single manually operable member by which the clutches and/or brake may be energized to rapidly effect starting, stopping, or reversal of rotation of a driven part under existing torque loads and without undue wear, strains, or damage to the mechanism.

A still further object of the invention is the provision of a novel and improved driving mechanism for a machine tool employing electromagnetic clutches of the variable torque type together with a control circuit including means to preselect the maximum torque transmitting capacity for the said clutches and a means to limit the said torque transmitting capacity thereof to a predetermined amount below the said maximum during starting and/or reversal, which limiting means is rendered ineffective when the driven shaft approaches full speed, the last-mentioned means being fully automatic and of the delayed acting type which may be adjusted to preselect its operational characteristics within a given range.

The invention further resides in certain novel features of construction and combination and arrangements of parts, and further objects and advantages of the invention will be apparent to those skilled in the art to which it pertains from the following description of the present preferred embodiment, and certain modifications thereof, described with reference to the accompanying drawings in which identical parts in the several views are designated by the same reference characters and in which:

Fig. 1 is a front elevational view of a machine tool, such as a turret lathe, embodying the invention;

Fig. 2 is a fragmentary horizontal section through the headstock of the machine tool shown in Fig. 1 with parts omitted and the gearing shown in developed relationship;

Fig. 7 is a fragmentary view, partly in section and partly in elevation, illustrating the two-part control lever employed in the embodiment of the invention shown in Figs. 1 through 6;

Fig. 8 is a view similar to Fig. 3 but illustrating a modified embodiment employing a plugging switch associated with the drive pulley and electromagnetic clutch;

Fig. 8a is similar to Fig. 5 illustrating the manner in which the two part control lever cooperates with the clutch-controlling switches for the modified embodiment of the invention represented by Fig. 8;

Fig. 9 is a simplified schematic wiring diagram similar to Fig. 6 showing the control circuit employed with the modified construction illustrated in Figs. 8 and 8a;

Fig. 10 is a fragmentary view similar to the upper portion of Fig. 2 but illustrating a modified form of gear train for the machine tool;

Fig. 11 is an enlarged fragmentary sectional view taken substantially on the lines 11—11 of Fig. 10;

Fig. 12 is a detached top plan view of a modified control lever for the form of the invention employing the constructions illustrated in Figs. 10 and 11;

Fig. 13 is a simplified electrical wiring diagram of a control circuit for the embodiment of the invention illustrated in Figs. 10 through 12;

Fig. 14 is an enlarged sectional view similar to Figs. 3, 8 and 11 but illustrating a still different embodiment of the invention;

Fig. 15 is a fragmentary view similar to a portion of Fig. 10 illustrating a part of the gear train for the embodiment represented by Fig. 14;

Fig. 16 is a view similar to Fig. 12 illustrating the control lever and switches controlled thereby for the embodiment of the invention illustrated in Figs. 14 and 15;

Fig. 17 is a simplified wiring diagram of the control circuit for the embodiment illustrated in Figs. 14, 15 and 16;

Fig. 18 is a view similar to Fig. 16 but illustrating the switch associated with the control lever for another embodiment of the invention;

Fig. 19 is a simplified wiring diagram of the control circuit for the embodiment of the invention employing the control means illustrated in Fig. 18; and Fig. 20 is a fragmentary view, parlty in elevation and partly in section, illustrating a wrench spindle for cooperation with the chuck on the main spindle of the machine tool together with an interlocking means for the wrench spindle which is incorporated in each of the modified forms of the invention.

Figure 3:
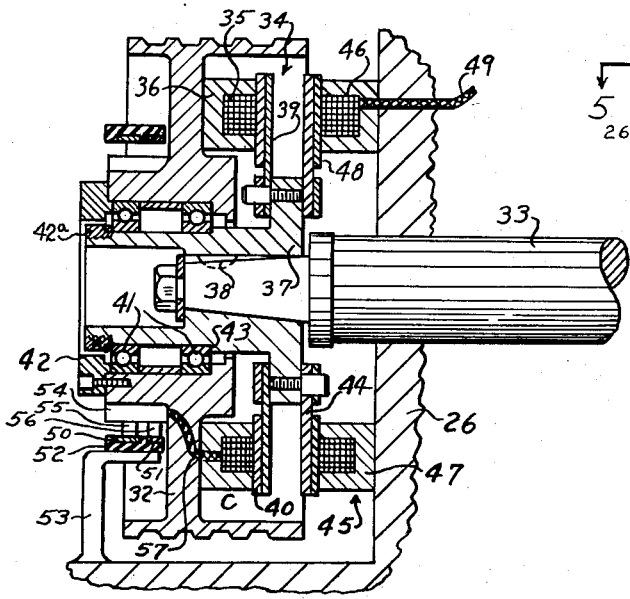
Fig. 3 is a fragmentary sectional view taken substantially on the line 3—3 of Fig. 2 and showing the variable torque electromagnetic clutch associated with the drive pulley of the machine tool.

Referring first to Fig. 1 of the drawings, the machine tool shown therein is for the most part of conventional construction and comprises the usual bed 25 on which is mounted the headstock 26 and the ways 27 for supporting the cross slide carriage 28 and the turret saddle 29. These parts of the machine are of conventional construction and hence will not be described in detail. Supported upon the machine tool adjacent to the headstock 26 is the main driving motor 30 which is operatively connected by a plurality of V-belts 31 to the main drive pulley 32, see Fig. 2. The pulley 32 is rotatably supported upon the main drive shaft 33 and is adapted to be selectively connected thereto by a clutch mechanism generally designated 34, see Fig. 3.

The clutch 34, in accordance with this invention, is of the electromagnetic variable torque type and comprises an energizing coil or coils 35, supported within an annular housing 36 which is in turn carried within and connected to the main pulley 32. The shaft 33 has a flanged sleeve 37 keyed thereto as indicated at 38, the flange of the sleeve having an annular disk 39 secured thereto for rotation therewith. The disk 39 constitutes the armature for the electromagnetic clutch and is frictionally engaged with the annular plate 40 supported by the housing 36 when the coil or coils 35 of the clutch are energized to thereby connect the drive pulley 32 with the shaft 33 for effecting rotation of the latter. When the coil or coils 35 are deenergized the pulley 32 is freely rotatable relative to the shaft 33 and for this purpose is supported by bearings 41 upon the sleeve 37. The bearings 41 are held in proper position and the pulley 32 is prevented from axial displacement outwardly relative to the sleeve by mounting rings 42 and 42a secured to the outer face of the hub of the pulley 32 and to the outer portion of sleeve 37, respectively, the said rings having inwardly extending portions engaging the races of the outer bearing 41. A spacing sleeve is provided between the bearings 41 and the inner race of the inner bearing 41 engages an integral shoulder 43 upon the sleeve 37 preventing displacement of pulley 32 inwardly of the sleeve 37.

The flange of the sleeve 37 is also provided with a second annular member 44 constituting the armature for an electromagnetic brake, generally designated 45, and comprising a coil or coils 46 carried within the recess of a housing member 47, which is secured to the headstock 26. The outer portion of the housing 47 is closed by an annular plate 48 with which the armature 44 is adapted to be frictionally engaged when the coil or coils of the brake are energized. Current for operating the brake 45 is supplied to the latter through a suitable conduit 49 while current for energization of the clutch 34 is provided through slip rings 50, 51 mounted in spaced relationship upon an insulating ring 52 which are supported by a bracket or other means 53 carried by the headstock 26. Supported upon the hub of the pulley 32 is an insulating block 54 upon which are mounted brushes 55 and 56 cooperating with the rings 50 and 51 respectively. Alternatively, the rings may be carried by the hub of the drive pulley and the brushes by the support 53. As here illustrated, the brushes 55, 56 are connected to wires contained within a conduit or cable 57 and extending to the coil or coils 35 of the clutch. Suitable wires or conduits, not shown, are connected with the rings 50 and 51 for conducting electrical energy thereto.

As shown in Fig. 2, the illustrated embodiment of the invention includes a gear train for connecting the drive shaft 33 with the main spindle 58 of the machine tool to drive the latter in either forward or reverse direction and at a plurality of different speeds, in this instance twelve different speeds being possible. Thus the shaft 33 is shown as having gears 59 and 60 rotatably supported thereon which are selectively connectible with the shaft 33 through separate mechanically actuated clutches 61 and 62 operated by a clutch ring 63 in response to movement thereof by a shoe 64 received in the groove 65 of the clutch ring, the shoe 64 being a part of a two-piece control mechanism or lever generally designated 66, see Figs. 5 and 7. This lever 66 comprises a manually operable handle portion 67 pivotally connected with a portion 68 pinned or otherwise connected to a shaft 69 extending vertically in the headstock of the machine. Surrounding the shaft 69 is a tubular member 70 to the lower end of which the previously mentioned shoe 64 is connected by an arm 71. The upper part of the sleeve 70 is cup-shaped as indicated at 72 and is diagonally slotted; see Fig. 5, the slots being of greater width than the width of a downwardly extending radial enlargement on the portion 68 so that the latter and the handle 67 are permitted lost movement of a predetermined extent before engaging and moving the tubular portion 70.

Figure 5:
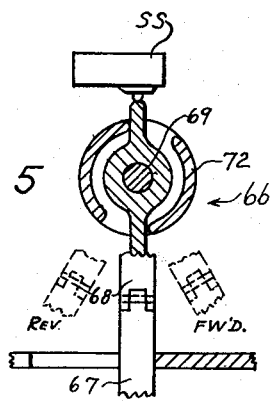
Fig. 5 is a fragmentary sectional view taken substantially on the line 5—5 of Figs. 4 and 7.

It will be apparent from the construction thus far described that when the handle 67 of the control lever is in one of its broken line positions indicated in Fig. 5, the tubular portion 70 will have been rotated thereby thus causing the shoe 64 to shift one of the clutches 61 or 62 into engagement. This will couple the corresponding gear 59 or 60 to the shaft 33 so that if the clutch 34 is also energized a drive is effected through the shaft 33 and through the latter to the gear 59 or the gear 60. Let it be assumed that the reverse clutch 61 has thus been engaged so that the spindle 58 is to be rotated in the reverse direction. Consequently, the gear 59 is now connected with the shaft 33 and drives a gear 73 through an idler gear 73a. The gear 73 is keyed to a shaft 74 which carries a gear cone 75 slidably keyed thereto and which may be shifted by the lever 76, see Fig. 1, to one of three positions for providing a selected speed of rotation. In the illustrated position, the gear 77 of the cone is in engagement with gear 78 keyed with the shaft 79 so that the said shaft is driven and rotates a gear 80. The gear 80 in turn drives a gear 81 which is freely rotatable upon the spindle 58. Gear 81 is shown as driving a gear 82 of a gear cone, the cone having been positioned by a lever 83, see Fig. 1. The gear cone of which gear 82 is a part is slidably keyed to the shaft 84 and this shaft also has a second gear cone 85 slidably keyed thereon, the cone 85 being positionable by a lever 86. In the illustrated position of the cone 85, the gear 87 thereof is in engagement with the bull gear 88 of the spindle 58, thus rotating the latter. The gear ratios may be readily changed in a conventional manner by operation of the several levers 76, 83 and 86 and hence will not be further described in detail.

In accordance with this embodiment of the invention, provision is made for stopping and starting the main shaft 33, and hence rotation of the spindle 58, while the gears are engaged for rotating the latter in a preselected direction and at a preselected speed and it is for this reason that the control lever 66 is formed in two parts as previously described. Referring again to Figs. 5 and 7, it will be seen that the portion 68 of the lever 66 is extended and cooperates with an electrical switch SS connected in the control circuit hereinafter described. The control lever 66 may be operated between "Stop" and "Reverse" positions, or between "Forward" and "Stop" positions illustrated in full lines and broken lines in Fig. 5, thereby operating the switch SS without, however, shifting the clutches 61 or 62.

If it is desired to shift from "Reverse" to "Forward" position, the lever 66 is moved from one extreme position to the other, represented by broken lines in Fig. 5. In thus actuating the lever, the initial part of the movement of the handle 67 actuates the switch SS without moving the tubular portion 70. However, when the lost motion provided between the portions 68 and the cup portion 72 of the lever has thus been taken up, the portion 68 engages the edges of the slot in the cup portion 72 thus rotating the latter so that arm 71 moves the clutch ring 63 to disengage that one of the clutches 61 or 62 which was engaged and then effects engagement of the other of these clutches. To facilitate a determination as to when the "Stop" position has been reached and thus prevent inadvertent throwing of the clutches 61, 62 when it is desired only to stop, the handle portion 67 of the lever 66 preferably passes through a cutout portion in the headstock which may be in the form of two parallel offset slots, see Fig. 4. With such a construction, the handle 67 of the lever 66 in moving from either "Reverse" or "Forward" position to "Stop," engages a shoulder such as 89 or 90 corresponding to the "Stop" position and in which position the switch SS is engaged. In order to pass beyond this stop position, the handle portion 67 of the control lever must be moved vertically relative to the portion 68 after which the lever may be further rocked to effect shifting of the clutches 61, 62.

In accordance with this invention, provision is made for the clutch 34 to have a preselected maximum torque transmitting capacity and, in addition, provision is made to limit the torque transmitting capacity of the clutch during initial engagement thereof and while the main spindle 58 is being brought up to substantially its operating speed, the last-mentioned means being automatically disconnected or rendered inoperative after this interval has elapsed. This prevents excessive wear and possible damage which might occur if the clutch 34 were initially fully engaged under the existing torque conditions when the spindle 58 is at rest and the pulley 32 is being rotated at its operating speed. The manner in which these results are effected will be more readily understood hereinafter.

In addition to the above-mentioned features, the illustrated machine tool has the spindle 58 thereof provided with a chuck 91, see Fig. 20, which is here illustrated as being of the universal type and which is adapted to be operated by a chuck wrench, the operating spindle or member 92 of which is adapted to engage in the operating socket 93 of the chuck when the work or tool spindle 58 is positioned in alignment therewith. To effect this engagement, a handle 94 is provided which is adapted to be pulled outwardly to thereby operate through the linkage 95, 96, 97, rack 98, gear segment 99 and a circular rack 100 on the wrench spindle 92 to move the latter into the socket 93 of the chuck. This operation and the drive for the wrench spindle 92 are well known and hence need not be described in detail.

In accordance with this invention, provisions are made to prevent engagement of the chuck wrench spindle with the chuck when the work or tool spindle 58 is being rotated and, conversely, to prevent rotation of the spindle 58 when the wrench spindle 92 is being utilized for manipulating the chuck 91. For this purpose the rack 98 of the wrench actuating mechanism is shown as having a recess 101 therein and which is adapted to receive a plunger 102 projected therein by an electromagnet WS when the latter is energized. Spring means within the electromagnet retract the plunger or member 102 and permit operation of the wrench spindle when the spindle 58 is at rest due to deenergization of the clutch 34 as hereinafter described. In order to prevent energization of the clutch 34 when the wrench spindle 92 is being utilized to open or close the chuck, the rack 98 additionally carries a member 103 which cooperates with a switch WLS. This switch WLS is disposed in a part of the control circuit for energizing the clutch and is normally closed when the wrench spindle 92 is retracted but is opened when the wrench spindle is moved into engagement with the chuck, as will be hereinafter apparent.

Figure 6:
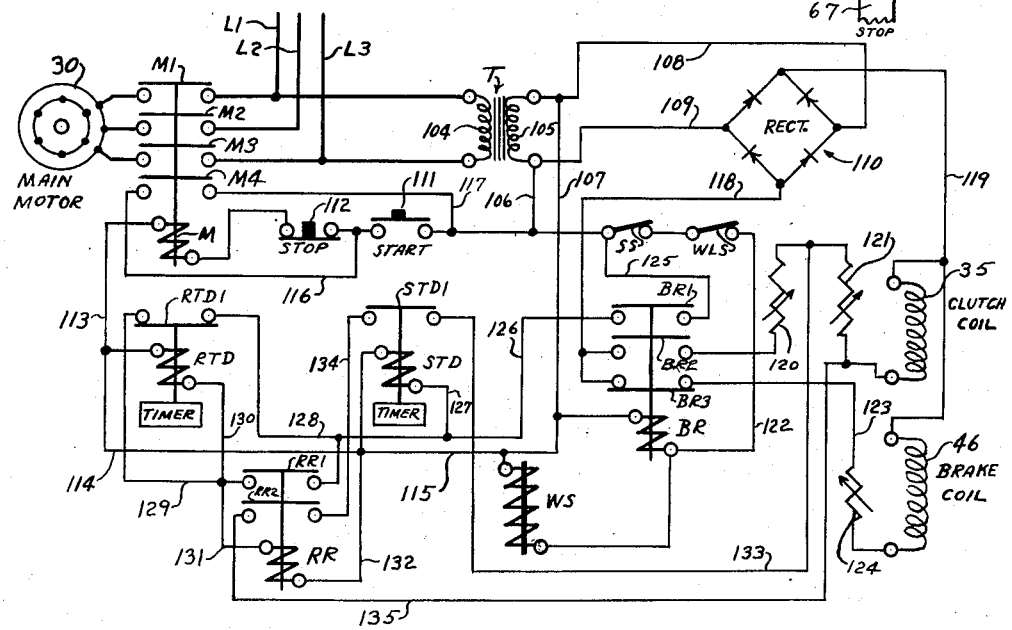
Fig. 6 is a simplified schematic wiring diagram of a control circuit for the embodiment of the invention illustrated in Figs. 1–5.

Referring now to Fig. 6 which illustrates one form of a control circuit embodying the invention, it will be seen that three-phase electrical power is provided thereto by the power supply lines L1, L2 and L3. The power supply lines L1 and L3 are connected to the primary 104 of a transformer T, the secondary 105 of which provides a reduced voltage for the control circuit through the main supply lines 106 and 107. Also connected with the secondary 105 of the transformer are supply lines 108 and 109 for a full-wave rectifier 110 which may be of the selenium type. The motor 30 is controlled by an electromagnetic relay or starter M under the control of a manually operated start switch 111, one side of which is connected with the wire 106 the other side of the start switch being connected through a stop switch 112 to one side of the coil of the motor starter M. The other side of the coil for the relay or starter M is connected by the wires 113, 114, 115 and 107 to the transformer T so that depressing the start button 111 energizes the motor starter M closing its contacts M1, M2, M3 and M4. Closing of the contacts M1, M2, and M3 connects the motor 30 with the power lines L1, L2 and L3 while closing of the contact M4 provides a holding circuit for the relay or starter M about the start switch 111 through the wires 116 and 117.

The rectifier 110 is provided for the purpose of supplying direct current, through the output wires 118 and 119, for operation of the clutch coil 35 and the brake coil 46. Thus, the output wire 118 of the rectifier 110 is connectible by a contact BR2 of a relay BR to a circuit extending through a first adjustable resistance 120 and a second adjustable resistance 121 to one terminal of the clutch coil 35, the other terminal of which coil is connected to the other output wire 119 of rectifier 110. Consequently, when the BR relay is energized, as hereinafter described, direct current is supplied to the clutch coil 35 in an amount predetermined by the settings of the resistances 120 and 121.

Let it be assumed that the control lever 66 has been moved to the "Forward" position, indicated in broken lines in Fig. 5, so that the portion 68 of the lever is no longer in engagement with the switch SS and clutch 62 is engaged. The movable contact of the SS switch is now in circuit closing position, and, if the wrench spindle 92 be in its retracted position shown in Fig. 20, the switch WLS will likewise be closed. Consequently, a circuit is now completed from the wire 106 through the switches SS and WLS to a wire 122 connected with one side of the coil for the relay BR, the circuit extending from the other side of the coil to the return line 107 of the control circuit. Therefore, the BR relay is energized, moving its contacts BR1 and BR2 to circuit closing position and opening its contact BR3. Closing of the contact BR2 energizes the clutch coil 35 through the previously mentioned circuit extending from wire 118 through contact BR2, resistances 120, 121, coil 35 and wire 119 in series. Opening of the contact BR3 breaks a circuit extending from the wire 118 through the contact BR3 and a wire 123 to and through a variable resistance 124 to one side of the brake coil 46, the circuit continuing from the other side of the brake coil to the wire 119. Since the brake coil 46 is deenergized and the drive pulley 32 is now clutched with the shaft 33, the latter is now driven.

The clutch 35 will at this time, however, not be energized to its maximum permissible extent due to the presence in its energizing circuit of the resistances 120 and 121. The resistance 120 is that which determines the maximum permissible torque which may be transmitted by the clutch while resistance 121 is the resistance which is initially in series with the clutch to limit the initial torque transmitting capacity thereof until the shaft 33 has attained substantially the speed of rotation of the pulley 32. Both of the resistances 120 and 121 are adjustable to provide the desired preselected values for the current supplied to the clutch coil and hence the corresponding torque transmitting capacities of the clutch.

Simultaneously with the energization of the clutch coil 35, the operation of the BR relay has, through the closing of its contacts BR1, completed a circuit from the wire 106 through the wire 125 to and through the contact BR1 to a wire 126 and thence through a wire 127 to one side of the coil of a relay STD. The other side of this relay is connected with the wire 115, and hence to the wire 107, so that the relay STD is now energized. This relay, as indicated in Fig. 6, is of the time delay type so that its movable contact does not operate for a predetermined time interval after the energization of the relay. Relays of this nature are well known and hence need not be described in detail. Suffice it to note that the relay is of the type whose time interval may be adjusted to thereby control the interval of time after its energization before its contact STD1 moves to circuit closing position.

Concurrently with the energization of the relay STD, a circuit is also completed through the contact BR1 and the wire 126 to a wire 128 and thence through the normally closed contact RTD1 of a relay RTD, the circuit continuing through wires 129 and 130 to one side of the coil of the relay RTD, the other side of the coil of the relay being connected through the wires 114, 115, and 107 to the other side of the transformer secondary 105. Consequently, the relay RTD is energized. The wire 129 is also connected with the coil of a relay RR through a wire 131, the other side of this relay being connected back to the transformer secondary 105 by wires 132, 115 and 107. Hence, the relay RR is also energized and closes its normally open contacts RR1 and RR2. Closing of the contact RR1 provides a holding circuit therethrough for the relays RR and RTD maintaining them energized even though the RTD1 contact is now opened by the energization of the RTD relay. The contacts STD1 and RR2 are connected in series with each other and bridged about the variable resistance 121 by means of the connecting wires 133, 134 and 135. Since the relays RR and STD are simultaneously energized at the time the BR relay is energized, the RR2 contacts are substantially immediately closed when the clutch 34 is energized as the result of lever 66 being moved to the "Forward" position. However, as mentioned heretofore, the STD relay is of the time delay type and hence its contact STD1 does not close until a predetermined time interval after the lever 66 has been positioned for clutch engagement. Consequently, the coil 35 of clutch 34 is initially energized with reduced current and allows some slippage between the driven pulley 32 and the shaft 33, thereby providing for a gentle start of the shaft 33. When the shaft 33 has substantially reached its full operating speed which is correlated with the operating speed of spindle 58, the predetermined time interval will have elapsed and the STD1 contact is then closed. This completes the previously mentioned bridging circuit about the resistance 121 so that the circuit for the clutch coil 35 is now bridged about the said resistance thereby providing a greater current for energization of the clutch coil, the extent of which is limited by the resistance 120 remaining in the circuit. Therefore, the clutch 35 is now engaged at its predetermined maximum torque transmitting capacity which has been preselected by the setting of the resistance 120 and if the torque on the shaft 33 should exceed this setting, damage cannot occur since the clutch 34 will slip until the condition is corrected.

Figure 4:
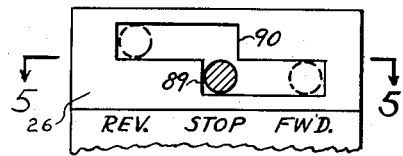
Fig. 4 is a fragmentary elevational view of a portion of the headstock of the machine shown in Fig. 1 illustrating the control lever of the mechanism in section.

After the desired machining operation has been completed, with the shaft 33, and hence the spindle 58, rotating in a forward direction as just described, the spindle 58 may be stopped without stopping the motor 30 and without the necessity of altering the gear setup by simply moving the control lever 66 to the position designated "Stop" in Figs. 4 and 5. This will bring the portion 68 of the lever into engagement with the switch SS, opening the latter, thereby deenergizing the BR relay so that its contacts BR1 and BR2 are opened and its contact BR3 is closed. Opening of the contact BR2 deenergizes the clutch coil 35, while closing the contact BR3 completes the previously described circuit therethrough thus energizing the coil 46 of the brake so that a braking force is applied to the shaft 33 while the pulley 32 is allowed to freely rotate relative thereto. The extent of the braking force applied at this time may be preselected by adjusting the resistance 124 in series with the brake coil 46 to thereby select the amount of electrical energy supplied to the latter. The shaft 33 and hence the spindle 58 are therefore quickly and easily brought to rest, at which time the power wrench spindle 92 may be utilized to open the chuck 91 if desired.

In the event the socket 93 of the chuck 91 is not properly positioned for cooperation with the wrench spindle 92, this positioning may be readily effected by momentary operation of the lever 66 to cause the portion 68 to move to and from engagement with the switch SS at the "Stop" position thus momentarily energizing and deenergizing the clutch. Hence the spindle is "inched" to its proper position since the clutch 62 is not disengaged by this operation of the control lever due to the lost motion therein. When the chuck 91 has been properly positioned, the lever 66 is allowed to remain in its "Stop" position while the chuck wrench spindle 92 is operated by means of the handle 94 as previously described. At this time the SS switch is open so that the solenoid WS is deenergized with the result that the pin 102 is retracted from engagement in the recess 101, by the spring not shown, so that the wrench spindle may be manipulated by means of the handle 94. When the wrench spindle is thus manipulated, the switch WLS will also be opened so that, if the control lever 66 should be inadvertently moved from the stop position while the wrench spindle is being utilized, the clutch 34 cannot be engaged, it being remembered that the circuit to the BR relay is held open at the switch WLS and this circuit is not closed again until the wrench spindle has been returned to its initial position shown in Fig. 20.

After a new workpiece has been inserted in the chuck 91 and the wrench spindle 92 returned to its initial position, the apparatus is then ready for a new operation and this may be effected by moving the control lever 66 to either the "Forward" or "Reverse" position depending upon the desired direction of rotation of the spindle 58. Operation of the lever from the "Stop" position to either the "Reverse" or "Forward" position will operate the control circuit as previously described to engage the clutch 34 and deenergize the brake 45 so that the pulley 32 is clutched to shaft 33 rotating the latter and the spindle 58. The spindle 58 is rotated in the desired direction since it will be remembered that, while the circuit is operated in the same manner for either the "Forward" or "Reverse," the control lever 66, in addition to operating the switch SS, also mechanically moves the clutch ring 63 to correspondingly shift the latter and thus selectively engage either the clutch 61 or 62 controlling the direction of rotation.

Let it be assumed that the machine has been placed in operation, as above described, so that the spindle is rotating in the "Forward" direction and that it is now desired to reverse the direction of rotation without stopping for any appreciable time. This is effected by moving the control lever from the "Forward" to the "Reverse" position in a substantially continuous movement. This can be readily accomplished in the apparatus of this invention without damage to the clutches of the mechanism due to the fact that the brake 45 is automatically momentarily applied and the current for energizing clutch 34 is automatically reduced as the direction of rotation of the spindle is altered.

Referring again to Fig. 6, it will be noted that when the control lever is moved through stop position, the switch SS is opened momentarily, thus breaking the energizing circuit therethrough for the relay BR so that the latter opens its contacts BR1 and BR2 and closes its contact BR3. Opening of the contact BR2 momentarily deenergizes the coil 35 of clutch 34, while closing of the contacts BR3 momentarily energizes the brake coil 46 through the previously described circuits. Consequently, the pulley 32 is momentarily disconnected from the shaft 33 and the latter has a braking force applied thereto. As the control lever moves through the "Stop" to the "Reverse" position, the switch SS is again closed so that the BR relay is again energized thereby closing its contacts BR1 and BR2 and opening its contact BR3. Opening of the contact BR3 deenergizes the brake coil 46, thus releasing the braking force from the shaft 33. Closing of the contact BR2 provides the previously described circuit through the resistances 120 and 121 for the clutch coil 35. Hence the coil 35 is again energized for transmitting a limited torque and thereby effecting a gentle start of rotation of shaft 33, it being remembered that the current flowing to the coil 35 at this time is limited by both the resistances 120 and 121 since when the control lever 66 moved through the "Stop" position, the momentary opening of the SS contact, resulting in the momentary deenergization of the BR relay, caused opening of the contact BR1 thereby deenergizing the STD, RTD and the RR relays.

The RTD relay is of the time delay type which delays the closing of its contact RTD1 for a preselected time after energization of the relay so that the RTD relay and the RR relays are not immediately energized upon the reclosing of the BR1 contact. Hence the bridging circuit around the resistance 121 is not completed at this time, thereby providing for the reduced energization of the clutch coil. After the predetermined time for which the time delay relay RTD has been set elapses, the resulting closing of its contact RTD1 provides the previously described circuit therethrough energizing the RTD relay and the RR relay. The energization of the RR relay closes its contacts RR1 and RR2 with the result that the RR1 provides the holding circuit maintaining the RTD and the RR relays energized after the RTD1 contact substantially immediately reopens as a result of the energization of the RTD relay. Closing of the RR2 contact together with the closing of the STD1 contact completes the bridging circuit about the resistance 121, thus bypassing the latter so that the clutch 35 is now energized with current of an amount predetermined solely by the setting of the variable resistance 120 so that the clutch 34 operates at its predetermined maximum torque transmitting capacity, the machine spindle operating in reverse since the lever 66 has also shifted the clutches 61 and 62. The time interval of relay RTD is preferably longer than that of the STD relay so that the time interval before the resistance 121 is short circuited is determined by the RTD relay when reversing the direction of rotation of the spindle 58 after the latter has once been placed in rotation.

The machine spindle 58 will continue to rotate in the reverse direction and may be started and stopped without again reversing the direction of its rotation or stopping the motor 30 by simply moving the control lever between its broken line position marked "Reverse" and the full line "Stop" position as shown in Fig. 5. This controls the circuit by repeated operations of the SS switch in the same manner as previously described in conjunction with similar operations of the spindle in the "Forward" direction. The motor 30 may be stopped whenever desired by operation of the stop button 112.

Figs. 8, 8a and 9 illustrate a modified embodiment of the invention in which the machine tool is constructed substantially as previously described with respect to Figs. 1 through 7 and includes the power chuck wrench as shown in Fig. 20. In this form of the invention, however, the SS switch is not employed and in place thereof two switches FS and RS are provided for cooperation with the control lever 66, the latter being constructed as previously described so that the portion 68 thereof cooperates with the switches FS and RS in substantially the same manner as the portion 68 cooperated with the switch SS in Fig. 5. In addition, the delayed acting mechanism for applying the maximum torque energizing current to the clutch 34 is now responsive to the speed of the shaft 33 rather than a time delay switch or switches as employed in the first described embodiment of the invention. Therefore, a plugging switch, generally designated PS, is employed. The plugging switch is of conventional construction and may be of the type disclosed in Clark Patent 2,405,686, issued August 13, 1946. The housing for the switch PS may be supported upon the bracket 53 which carries the collector rings 50 and 51 with the rotatable member of the switch mechanism connected with the shaft 33, see Fig. 8.

The wiring diagram for this embodiment of the invention is illustrated in Fig. 9 and, in the main, is substantially the same as that illustrated in Fig. 6. Consequently, corresponding parts performing the same functions bear the same numerals. As before, the motor 30 is adapted to be connected to the power supply lines L1, L2 and L3 through the contacts M1, M2, M3 of the motor starter or relay M under control of the start and stop switch 111 and 112. Likewise, the control portion of the circuit is energized through a transformer T, the operating current for the clutch coil 35 and the brake coil 46 being supplied from a rectifier 110 in the same manner as previously described in conjunction with Fig. 6. Likewise, the circuit includes the wrench spindle solenoid WS and the wrench spindle limit switch WLS operating as previously described to prevent improper operation of the power chuck wrench when the clutch 34 for rotating the spindle is energized, and conversely.

Operation of this embodiment of the invention is initiated by pressing start button 111 as heretofore mentioned, thus placing the motor 30 in operation, a holding circuit for the motor starter M being provided about the switch 111 by the contact M4. Assuming that the power chuck has been placed in its inoperative position and that the control lever 66 has been moved for operation of the spindle in the "Forward" direction, switch WLS is closed as is also the switch FS by engagement of the latter by the lever 66. Likewise, the sleeve 70 of the operating lever will have shifted the clutch ring 63 to engage the clutch 62, see Fig. 2, so that the gear train is conditioned for rotation of the machine spindle 58 in the forward direction. A circuit has thus been provided from the secondary 105 of the transformer T through the wire 106, switch WLS and the now closed switch FS to the solenoid WS and thence through the wire 107 back to the secondary 105 of the transformer T, thus energizing the solenoid WS and projecting the interlock pin or plunger 102 into the recess 101 to lock the power chuck wrench spindle against operation; see Fig. 20.

A circuit is also completed through the switches WLS and FS to and through the coil of a relay 1RR, the latter being connected back to the other side of the transformer by the wire 107. Therefore, the relay 1RR is now energized thereby opening its normally closed contact 1RR1 and closing its normally open contact 1RR2. Opening of the contact 1RR1 has opened the circuit from the rectifier through the output wire 136, contact 1RR1, wire 137, and the variable resistance 124, which adjusts the holding force of the brake, to the brake coil 46, the circuit being completed by the wire 138 connecting the coil 46 to the other side of the rectifier 110. Consequently, the brake 45 is released. The simultaneous closing of the contact 1RR2 has completed a circuit from the rectifier 110 through the wire 136 to a wire 139, thence through the clutch torque controlling adjustable resistances 121 and 120 in series to the clutch coil 35 and through the latter to the wire 138 connected with rectifier 110. Therefore, the clutch coil is energized with the reduced current provided through the two resistances 120 and 121 so that the clutch 34 is engaged with its minimum torque transmitting capacity thus providing a gentle start for the spindle 58. When the spindle 58 has substantially reached its intended predetermined operating speed, the movable contact of the plugging switch PS will have engaged a stationary contact thereof thereby bridging or short-circuiting the resistance 121 so that the clutch 34 has the coil 35 thereof energized with greater current to provide the maximum torque transmitting capacity which is determined by the setting of the resistance 120. The machine therefore continues to operate the spindle 58 at this predetermined maximum torque so long as the control lever 66 remains in the "Forward" position.

Let it be assumed that it is now desired to stop the spindle 58 without reversing the direction of rotation thereof. The lever 66 is then moved to the intermediate position marked "Stop" as shown in Figs. 4 and 8a. It will be observed that this moves the lever from engagement with the FS switch without however shifting the sleeve 70 and hence without changing the engagement of the clutch 62 so that the gear train remains connected for forward rotation of the spindle. However, the movement of the control lever 66 has deenergized the clutch 34 thus interrupting the drive to the shaft 33 and at the same time has applied the brake 45 thus stopping the latter and the spindle 58. This is effected by virtue of the fact that the recited release of the switch FS has opened the circuit therethrough deenergizing the relay 1RR so that the contact 1RR2 is opened and the contact 1RR1 is closed. Opening of the former contact breaks the circuit therethrough to the clutch coil 35 deenergizing the latter. Closing of the contact 1RR1 completes the circuit through the latter energizing the brake coil 46 to apply the predetermined braking force as determined by the setting of the resistance 124.

The operation of the control lever 66 has also prepared the circuit permitting manipulation of the power chuck wrench since the opening of the switch FS breaks the circuit to the solenoid WS thus causing the pin or plunger 102 to be withdrawn by action of the spring, not shown. Hence the wrench spindle 92 may now be operated to open the chuck 91 if desired. When the wrench spindle 92 is thus operated the switch WLS will be opened, thus preventing inadvertent rotation of the spindle since the clutch cannot be engaged even though the lever 66 is moved because the circuit is held open at the switch WLS. To properly locate the socket 93 of the chuck 91 with respect to the wrench spindle, inching of the spindle 58 may be effected as previously described with respect to the embodiment shown in Figs. 1 through 7, by repeated manipulations of the lever 66 to and from engagement with the switch FS prior to the time the chuck wrench is utilized so that the switch WLS remains closed.

When the chuck wrench spindle 92 has been restored to its initial inactive position after a new workpiece has been inserted in the chuck, the switch WLS is closed by engagement of the abutment 103 therewith thus establishing the circuit for a new operation of the machine. In view of the fact that the spindle has come to rest, the movable contact of the plugging switch has assumed its intermediate position and, consequently, if the control lever 66 now be again moved to its "Forward" position the clutch 34 will be energized as before described to initially provide a minimum torque transmitting capacity, until the driven shaft 33, and hence the spindle 58, have reached substantially their predetermined speeds at which time the plugging switch will close its contact to again short-circuit resistance 121 and provide the predetermined maximum torque transmitting capacity of the clutch.

When it is desired to reverse the direction of rotation of the machine spindle 58, the control lever 66 is moved to its opposite extreme position. Assuming it has previously been in the "Forward" position, it will therefore have to pass through the "Stop" position which will deenergize the clutch 34 and apply the brake 45 as previously described. During this time the plugging switch PS will have returned to its initial position. As the lever 66 continues in its movement to the "Reverse" position, it now engages the switch RS closing the latter and thus energizing the solenoid WS and the relay 1RR. In addition this movement of the control lever 66 has shifted the clutch ring 63 disengaging the clutch 62 and engaging the clutch 61. The clutch coil 35 will then be energized to provide the reduced torque transmitting capacity through the same circuit and in the same manner as previously described for forward operation except that the circuit is now completed through the RS instead of the FS switch. After the driven shaft 33, and hence the machine spindle 58, have substantially reached the predetermined speed, the plugging switch PS closes its contacts, short-circuiting the resistance 121 so that thereafter the clutch 34 operates with the predetermined maximum torque transmitting capacity as determined by the setting of the resistance 120. The spindle may be stopped and repeatedly rotated in the reverse direction, without altering the setting of the gears or stopping the motor 30, by simply moving the control lever 66 between the "Reverse" and "Stop" positions in the same manner as was previously described for the "Forward" operation. Also, the spindle 58 may be stopped and the power chuck wrench operated in the same manner as previously described. Likewise a shift from "Reverse" to "Forward" rotation of the spindle may be effected by simply moving the lever 66 in the opposite direction to that previously mentioned, at which time the clutch 34 will be momentarily deenergized as the lever passes through the "Stop" position, the brake 45 applied, the mechanical clutches 62 and 61 shifted, and a clutch coil 35 reenergized through the resistance 120, 121 in series, it being remembered that the plugging switch returns to its initial position when the speed of shaft 33 is reduced below its predetermined maximum. When the chuck spindle 58 and shaft 33 again reach maximum speed, the resistance 121 will be once more removed from the circuit.

It will be observed that the control lever 66 extends through the offset slotted portion of the headstock 26 in this embodiment of the invention in the same manner as previously described with respect to Fig. 4. The shoulders 89 and 90 of such an arrangement provide an easy and positive identification of the "Stop" position when shifting from either the "Forward" or "Reverse" positions, thus enabling the operator to determine that the proper circuit relationships have been established for stopping and preventing inadvertent shifting of the mechanical clutches 61 and 62 since, in order to effect shifting of these clutches, it is necessary to move beyond the "Stop" position and which requires a vertical as well as lateral movement of the lever.

Figs. 10 through 13 illustrate another embodiment of the invention employing separate forward and reverse variable torque electromagnetic clutches as well as an electromagnetic brake. Consequently, in this form of the invention the forward and reverse mechanically shifted clutches such as 61 and 62 are not employed, their functions being taken over by the separate electromagnetic clutches. As shown in Fig. 11, the outer end of the shaft 33 is provided with a sleeve 140 which is keyed to the shaft and abuts an integral shoulder thereon. Provided on the outer circumference of the sleeve 140 are antifriction bearings 141 and 142 journalling the main driving pulley 32 for rotation relative to the shaft 33, the bearings being held in place by rings 143, 143a and a spacer sleeve in a manner similar to that shown in Fig. 3

A forwardly extending reduced diameter portion of the sleeve 140 has a disk member 144 keyed thereto. This disk member has an inwardly projecting annular portion forming an armature for a variable torque electromagnetic clutch 145, the housing 146 of which is secured to the pulley 32. This housing 146 has an annular recess in which is positioned the energizing coil or coils 147 for the clutch, the recess being closed by a sealing ring 148 which provides a friction surface for cooperation with a removable friction plate 149 on the disk 144. This clutch is therefore constructed, and operates to clutch the pulley 32 with the shaft 33 when energized, in a manner similar to that previously described for the clutch 34.

The shaft 33 is additionally provided with a gear sleeve 150 extending through the headstock 26 and journalled therein, this sleeve having the shaft 33 rotatably supported therein. The outer portion of the gear sleeve 150 has a radially extending flange 151 to the opposite sides of which are secured annular members 152 and 153. The annular member 152 forms the armature for a variable torque electromagnetic clutch, generally designated 154, while the annular disk 153 provides the armature for an electromagnetic brake 155. The clutch 154 is constructed similarly to the clutch 145 and comprises a housing 156 secured to the pulley 32, which housing has a recess in which is positioned the coil 157, the housing being closed by a sealing plate 158 which cooperates with the disk 152 to provide the friction surfaces for coupling the pulley 32 to the gear sleeve 150 when the clutch 154 is energized.

The inner end of the sleeve 150 is provided with a gear 159 which is the reversing gear and is similar in function to the gear 59 as shown in Fig. 2. That is to say, the gear 159 normally meshes with a gear such as 73a of a gear train similar to that illustrated in Fig. 2 and incorporated within the headstock 26, see also Fig. 10. Keyed to the shaft 33 is a gear 160 which is equivalent in function to the gear 60 shown in Fig. 2 and cooperates with the gear train within the housing 26 as will be readily apparent from the previous description.

As previously mentioned, the annular member 153 comprises the armature for the electromagnetic brake 155. This brake is constructed similarly to that designated 45 in Fig. 3 and includes a housing member 161 connected with the headstock 26, the brake coil 162 being mounted in a recess of the housing 161 which recess is closed by a sealing plate 163 providing a surface cooperating with the annular member 153 for frictional engagement when the brake is energized.

The presently described embodiment of the invention employs a speed responsive switch such as a plugging switch in the control circuit providing the automatic delay during which the clutches are supplied with electrical current of reduced value for a gentle start, the plugging switch removing resistance from the circuit of the operative clutch when the speed of the shaft 33 and hence spindle 58 have reached the predetermined value. The manner in which this is effected will be hereinafter described in detail. For the present it is sufficient to note that the plugging switch 1PS is connected with the intermediate shaft 74 for rotation therewith, see Fig. 10, so that its speed and direction of rotation are related to the speed and direction of rotation of the spindle 58. In this regard, it should be noted that when the forward clutch 145 is energized the drive pulley 32 is connected with the shaft 33 through the clutch thereby driving the gear 160 and the intermeshing gear upon the shaft 74. Conversely, when the reverse clutch 154 is energized, the gear 159 is driven by the pulley 32 thereby driving the gears 73a, 73 and the shaft 74 in the opposite direction to its previous direction of rotation. When the brake 155 is energized, it acts directly upon the gear sleeve 150 and hence retards rotation of the reverse gear 159 so that if the rotation of the spindle 58 has been in the reverse direction, it will be brought to rest. Conversely, if the spindle 58 has been rotating in the forward direction and the brake is energized, the braking force is now exerted upon the shaft 74 through the reverse gear 159, and gears 73a, 73, thereby acting upon the gear train to brake the rotation of it and the spindle 58 in the same manner.

The control lever for operating the clutches and brake may be constructed as previously described with respect to Figs. such as 4, 5 and 7. However, in the present embodiment there are no mechanically actuated clutches and hence the two-part lever, comprising the sleeve or tubular member and shaft of the previous construction, is unnecessary. Therefore the control lever can be a simple manually operable handle such as 164, see Fig. 12, which has a small projecting portion 165 for cooperation with switches 1FS and 1RS similar to the switches FS and RS in the previously described embodiment, see Figs. 8a and 12. The operation of this form of the apparatus will be more fully understood with reference to the wiring diagram therefor shown in Fig. 13.

As shown in Fig. 13, three-phase electrical power is supplied to the apparatus through the power supply lines L1, L2 and L3, the power lines L1 and L3 being connected with the transformer T having the primary 104 and secondary 105 as previously described for the other embodiments. Likewise, the secondary 105 of transformer T is connected with the rectifier 110 and to the control circuit for the apparatus in a manner similar to that in the previously described embodiments. Specifically, the start switch 111 and stop switch 112 are again connected in series with the coil of the motor starter M which controls the starting of the main motor 30, the other side of the coil for the motor starter M being connected by wires 166 and 167 back to the transformer T. Connected in parallel with the coil of the motor starter M is the coil of a second motor starter RT having contacts RT1, RT2 and RT3 controlling the energizing circuit to a rapid traverse motor 168 which may be utilized, for example, to provide a rapid idle movement for the slides 28 and 29 of the machine tool. It will be readily apparent that upon actuation of the start switch 111, the motor starter relays M and RT will be energized thus closing their normally open contacts M1, M2, M3, M4 and RT1, RT2, RT3, respectively. Closing of the contacts M1, M2 and M3 energizes the main motor 30 while closing of the contacts RT1, RT2, RT3 energizes the rapid traverse motor 168. Closing of the contact M4 provides a holding circuit through the wires 169 and 170 bridged about the start switch 111 so that the motors 30 and 168 remain energized when the start button 111 is released.

Let it be assumed that the first operation of the machine spindle 58 is to be in the forward direction and that the power chuck wrench is in its inoperative position. The control lever 164 is then moved to its "Forward" position thus causing the projection 165 to engage and actuate the switch 1FS, see Fig. 12, operating the latter to closed position. Since the chuck wrench spindle is in inoperative position, the switch WLS is closed and consequently a circuit is completed through the latter and through the now closed switch 1FS to a wire 171 connected with one side of a forward relay F, the other side of which is connected by a wire 172 to the wire 167 and hence back to the transformer T. Consequently, relay F is energized, closing its normally open contacts F1 and F3 and opening its normally closed contacts F2. Closing of the normally open contact F3 completes a circuit from one side of the rectifier 110 through a wire 173 and the torque limiting resistances 174 and 175 corresponding with the previously described resistances 120 and 121. The resistance 175 is variable and provides for a predetermined maximum torque transmitting capacity of the clutch 145. The resistance 174 is likewise variable and is provided to reduce the energization of the clutch and hence its torque transmitting capacity at the start to thereby provide a gentle start of the spindle. The circuit continues from the resistances 174 and 175 through a wire 176, the now closed contact F3 to a wire 177 and thence through the forward clutch coil 147, the circuit being completed to the rectifier 110 through a wire 178. Consequently, the forward clutch 145 is now energized connecting the pulley 32 with the shaft 33 for driving the spindle 58 in the forward direction, the torque transmitting capacity through the clutch at this time being limited by the resistances 174 and 175.

Simultaneously with the energization of the clutch 145, the opening of the contact F2 has opened the circuit extending therethrough and through the normally closed contact R2 of a relay R, through a wire 179, variable resistance 180 and the brake coil 162, the circuit being completed to the rectifier 110 through the wire 178 so that the brake 155 is released. In addition, the closing of the contact F1 has completed a circuit therethrough from one side of the transformer 105 to a wire 181, thence to one side of the wrench solenoid WS, the other side of which is connected back to the transformer through the wire 167. This projects the plunger or rod 102 into the recess 101 preventing inadvertent operation of the chuck wrench spindle when the clutch is engaged for rotating spindle 58.

As the spindle 58 continues to rotate its speed increases and when it has reached substantially the predetermined value, the plugging switch 1PS, provided on the shaft 74, closes its movable contact to the stationary contact 182 thereby bridging or short-circuiting the resistance 174 so that the energization of the clutch 145 is increased to the predetermined amount established by the setting of the resistance 175 thus providing the maximum predetermined torque transmitting capacity for the clutch 145.

When the operation corresponding with the forward rotation of spindle 58 has been completed and it is desired to stop the spindle for the purpose of removing the work or performing other operations thereon, the lever 164 is moved to its intermediate position indicated in full lines in Fig. 12. This releases the switch 1FS allowing the contact thereof to open thereby deenergizing the F relay so that the contacts F1 and F3 are open and the contact F2 is closed. Opening of the contact F3 opens the circuit through the forward clutch 145 deenergizing the latter. Opening of the contact F1 interrupts the circuit to the wrench solenoid WS so that the plunger or pin 102 is withdrawn from the recess 101 of the wrench mechanism preparing the latter for operation. Closing of the contact F2 completes a circuit from the rectifier through the wire 173, contact F2, the now closed contact R2 of relay R, and the wire 179, thence through the adjustable resistance 180 to and through the brake solenoid 162 energizing the latter, which therefore applies braking force of a value determined by the setting of the adjustable resistance 180. As the spindle 58 comes to rest, the movable contact of the plugging switch 1PS will have returned to its initial position and hence is disengaged from the stationary contact 182. If, therefore, it now be desired to "inch" the spindle 58 to position the chuck 91 for cooperation with the chuck wrench spindle 92, this may be readily effected by momentarily operating the manual jog switch 183 which is bridged around the switch 1FS and provides for momentary energization of the relay F with corresponding energization of the clutch 145 and deenergization of the brake 155 as previously described. The energization of the clutch 145 is, however, at the reduced torque transmitting capacity due to the fact that it is energized for a relatively short interval of time and hence the plugging switch 1PS does not bridge the resistance 174 so that both resistances 174 and 175 remain in the circuit of the clutch.

When the spindle 58 has been properly positioned, the circuits are then as previously described with the brake applied and the clutch 145 deenergized. The chuck wrench may now be operated as has been described for the other embodiments and while it is manipulated, the switch WLS will be open preventing inadvertent operation of either of the clutches 145 or 154. When the chuck wrench spindle is returned to its initial position, the switch WLS will again be closed thus preparing the circuit for a new operation to effect rotation of the spindle 58.

Let it be assumed that the new operation is to be in the reverse direction. The lever 164 is then moved to engage the switch 1RS, thus closing the latter and completing a circuit therethrough from one side of the transformer secondary 105 to a wire 184 which is connected with one side of the coil of the relay R, the other side of the relay coil R being connected to the opposite side of the transformer secondary 105 through the wire 167. The resulting energization of relay R causes it to close its normally open contacts R1 and R3 and open its normally closed contact R2. Closing of the contact R3 completes a circuit extending from the rectifier 110 through the wire 173 and the variable resistances 185 and 186, in series, to a wire 187, thence through the now closed contact R3 to a wire 188 connected with one side of the clutch coil 157, the circuit being completed through the wire 178 to the other side of the rectifier 110. Consequently, the reverse clutch 154 is now energized coupling the pulley 32 with the reverse gear 159 so that the spindle 58 is rotated in the reverse direction. The simultaneous opening of the contact R2 has opened the circuit therethrough to the brake coil 162, thus deenergizing the brake 155. The simultaneous closing of the contact R1 has completed a circuit therethrough to and through the wrench solenoid WS projecting the plunger 102 into the recess 101, see Fig. 20, as previously described, to prevent improper operation of the chuck wrench.

As the speed of the spindle 58 is increased to the predetermined maximum, the movable contact of the plugging switch 1PS moves into engagement with the other stationary contact 189 thereof thereby bridging or shorting the variable resistance 185 so that the energization of the reverse clutch 154 is now at the predetermined maximum value established by the setting of the variable resistance 186. The spindle 58 may now rotate at its predetermined maximum torque transmitting capacity until the desired operation is effected upon the work whereupon the spindle 58 may be stopped by placing the lever 164 in the intermediate position. This will open the switch 1RS thereby deenergizing relay R so that the contacts R1 and R3 are opened and the contact R2 is closed. The opening of the contact R3 deenergizes the reverse clutch 154, while the closing of the contact R2 energizes the brake 155, as previously described, applying a braking force to the spindle. Opening of the contact R1 deenergizes the wrench solenoid WS, as will now be apparent, preparing the apparatus for use of the chuck wrench if this be desired.

In this embodiment of the invention a reversal of direction of rotation of the spindle may be effected by simply moving the control lever from one of its extreme positions to the other. Let it be assumed that the lever 164 has been previously disposed in the "Forward" position so that the spindle 58 is rotating in the forward direction due to energization of the clutch 145 as previously described. If it is now desired to reverse the rotation of the spindle 58, the lever 164 is simply moved to its "Reverse" position. During this movement, the switch 1FS is first opened which deenergizes relay F, thereby deenergizing the forward clutch 145 and applying the brake 155 as has previously been described. This slows the spindle 58, and of course the shaft 74, so that the plugging switch 1PS moves to its intermediate position disengaged from the contact 182. As the lever 164 is now moved further to its new position the switch 1RS is closed thereby releasing the brake 155 and energizing the reverse clutch 154 through the circuits previously described. The initial rotation of the spindle 58 in this direction is effected in a relatively soft or gentle manner since the reverse clutch coil 157 is initially energized through both resistances 185 and 186 and the clutch does not reach its maximum torque transmitting capacity until the spindle 58 has reached substantially its predetermined speed at which time the movable contact of the plugging switch 1PS on the shaft 74 will have moved into engagement with the contact 189 thereby bridging the resistance 185 so that the reverse clutch 154 is now energized at its predetermined maximum torque transmitting capacity. When moving the lever 164 to change from reverse to forward rotation of spindle 58, the manipulation of the lever 164 results in providing circuit conditions similar to those just described when moving forward to reverse and hence need not be repeated.

Figs. 14 to 17 illustrate a still further modification of the invention which is similar to that shown in Figs. 10 through 13 in that it employs a forward and reverse clutch cooperating with the pulley 32. In the instant embodiment, however, there is no electromagnetic brake. Instead braking is effected by momentarily energizing the clutch opposite to that being utilized for driving. In view of the fact that the clutches employed are the same and are connected upon the shaft 33 and the pulley 32 in the same manner as those shown in Fig. 11, the same reference numerals are employed for similar parts in this embodiment of the invention and the details will not be again described.

In the present embodiment two speed responsive plugging switches are employed and may be connected to either the same or opposite ends of the shaft 74. As illustrated, however, these switches 2PS and 3PS are connected at the same end of shaft 74, see Fig. 15. One plugging switch, 2PS, corresponds with that heretofore described in conjunction with the other embodiments and responds to the upper limit of speed of shaft 74 which is correlated to the speed of the spindle 58. The other plugging switch, 3PS, controls the circuit for energization of the clutch opposite to that being utilized for effecting drive of the spindle to thereby provide a braking action through the said opposite clutch until the spindle is brought to substantially a stop at which time the plugging switch 3PS opens to deenergize the said opposite clutch.

Referring now to Fig. 17, three phase alternating electrical power is supplied to the machine through the power supply lines L1, L2 and L3, as previously described. Likewise, a transformer T, having a primary winding 104 and a secondary winding 105, is provided as is also a rectifier 110. Similarly, this embodiment of the invention is provided with the motor starter M having contacts M1, M2 and M3, controlling the energization of the main motor 30, and a contact M4 providing a holding circuit for the starter M as well as for the motor starter RT which is provided for the rapid traverse motor 168. This portion of the circuit is the same as previously described with respect to Fig. 13 and hence will not be again described. For the purpose of this description it is sufficient to note that when the control lever 164 is moved to the forward position it engages and operates a switch 2FS. This switch has normally open contacts 2FS1 and 2FS2 and a normally closed contact 2FS3. Consequently, the above-mentioned movement of the lever 164 has closed the two contacts 2FS1, 2FS2 and opened the contact 2FS3. Therefore a circuit is completed extending from one side of the rectifier 110 through the wires 190 and 191 to and through the variable resistances 192 and 193, in series, to wires 194, 195 and thence through the now closed contact 2FS2 to and through the normally closed contact 2RS2 of switch 2RS. The circuit continues to and through the forward clutch coil 147, the circuit being completed by the wire 196 extending back to the other side of the rectifier 110. Consequently, the forward clutch 145 is energized to provide the reduced torque transmitting capacity for rotation of the spindle 58, which reduced torque capacity is determined by the settings of the variable resistances 192 and 193. At the same time, the opening of the contact 2FS3 has interrupted a circuit therethrough, subsequently to be described, to the reverse clutch coil 157 thereby insuring against inadvertent operation of this clutch.

The closing of the contact 2FS1 has completed a circuit from one side of the transformer secondary 105 through the wrench solenoid WS to a wire 197 thence through wire 198 and the now closed contact 2FS1 to a wire 199 which is connected to the other side of the transformer secondary 105 through the wire 200. Consequently, inadvertent operation of the power chuck spindle is prevented as has been previously described with respect to the other embodiments. The only difference to be noted in the instant embodiment is that the switch WLS, associated with the chuck wrench, is now connected in the energizing circuit for the rectifier 110 rather than in the output circuit thereof as heretofore.

As a result of the above mentioned operations, the forward clutch 145 is energized under reduced torque transmitting capacity and begins the rotation of the spindle 58 bringing the latter up to speed. When substantially the desired predetermined speed of the spindle 58 has been reached, the shaft 74 will be rotating at a related speed sufficient to move the movable contact of the plugging switch 2PS into engagement with the stationary contact 201 thereof. This bridges or bypasses the variable resistance 192 so that the clutch 145 is now energized for its maximum torque transmitting capacity as has been previously described for the other embodiments.

If it now be desired to stop the spindle 58, the lever 164 may be moved to its intermediate position thereby releasing the switch 2FS so that the contacts 2FS1, 2FS2 are opened and contact 2FS3 again closes. Opening of the contact 2FS1 deenergizes the wrench solenoid WS, thus preparing the chuck wrench mechanism for subsequent operation. Opening of the contact 2FS2 deenergizes the forward clutch coil 147 thus removing the driving force for the spindle 58. Closing of the contact 2FS3 now completes a circuit in the energization path of the reverse clutch, about to be described, to effect a braking action.

During the rotation of the spindle 58, while the clutch 145 was energized as heretofore mentioned, the second plugging switch 3PS was also operating and the movable contact had therefore swung into engagement with the stationary contact 202 thereof. Therefore, a circuit was completed from one side of the transformer T through the wires 200, 199 and the contact TFS1 to the wire 198 thence through the movable contact of the plugging switch 3PS to the stationary contact 202 thereof, the circuit continuing through the wire 203 to and through the coil of a relay FR to a wire 204, the circuit being completed through the wires 205 and 206 to the other side of the secondary 105 of transformer T thereby energizing the relay FR. This causes the contacts FR1 and FR2 to close. Closing of the contact FR1 provided a holding circuit therethrough from the wire 200 to a wire 207, connected with the movable contact of the plugging switch 3PS, and hence through the previously mentioned circuit and the coil of the relay FR to the other side of the transformer. The contact FR2 is in the series circuit extending from the rectifier 110 through the wire 190 and movable contact of the plugging switch 2PS or through the variable resistance 208 which is in parallel therewith, through the resistance 209, wire 210 to the switch contact 2FS3, the circuit continuing on the other side of this contact through a wire 211 to and through the normally closed contact 212a of a jog switch 212 and thence through a wire 213 to the contact FR2. After passing through the contact FR2, this circuit continues through a wire 214 to the reverse clutch coil 157, the circuit being completed to the wire 196 extending to the opposite side of the rectifier.

It will be seen therefore that the contact FR2 is closed during the time that the forward clutch FR is energized through the 2FS switch but the circuit to the reverse clutch 154 is not completed since the contact 2FS3 in this energizing circuit for the reverse clutch is open. However, when the lever 164 is moved to its "Stop" position, the switch 2FS is released so that the contacts 2FS1, 2FS2 open, as previously described, and the contact 2FS3 closes. Consequently, the forward clutch 145 is now deenergized while the reverse clutch 154 is energized under control of the movable contact of the plugging switch 3PS. Therefore, the reverse clutch coil 157 is energized at reduced torque transmitting capacity, as determined by the settings of the adjustable resistances 208 and 209, to effect braking of the spindle 58.

As the speed of the spindle drops, the speed of the shaft 74 is correspondingly reduced and when the shaft and spindle have substantially stopped, the movable contact of the plugging switch 3PS moves from engagement with the stationary contact 202 thereby breaking the holding circuit for the relay FR so that the contacts FR1 and FR2 thereof are opened. Opening of the contact FR2 opens the previously described circuit to the reverse clutch 154 so that the latter is now deenergized. As previously mentioned, the circuit for the wrench solenoid WS is controlled by the contacts 2FS1 with the result that the mechanism is prepared for operation of the chuck wrench when the lever 164 is in its intermediate position with the contact 2FS1 open. When the chuck wrench is employed, as has been previously described, the limit switch WLS is opened thereby deenergizing the rectifier 110 so that neither clutch 145 nor 154 can be inadvertently energized by moving the lever 164.

When it is desired to rotate the spindle 58 in the reverse direction, the control lever 164 is moved to the opposite position from that previously described and in its now position it engages and operates the switch 2RS. This switch includes the previously mentioned normally closed contact 2RS2 and the normally open contacts 2RS1 and 2RS3. Consequently, operation of the switch 2RS breaks the circuit to the forward clutch, which circuit extends through the contact 2RS2, thereby preventing inadvertent operation of that clutch. The closing of the contact 2RS3 closes the previously described circuit therethrough extending from the wire 190 through the resistances 208, 209 in series to and through the wire 210, the now closed contact 2FS3, wire 211, normally closed contact 212a of the jog switch 212, through the wire 213 and the now closed contact 2RS3 to and through the reverse clutch coil 157, the circuit being completed to the other side of the rectifier through the wire 196. Consequently, the reverse clutch 154 is now energized under the reduced torque transmitting capacity as predetermined by the setting of the variable resistances 208 and 209 with the result that the spindle 58 is brought to speed without undue strain or wear between the parts.

When the speed of the spindle 58 is substantially at the desired predetermined value, the movable contact of the plugging switch 2PS will have moved into engagement with the stationary contact 215 thereof, thereby bridging or bypassing the resistance 208 so that the reverse clutch is energized at substantially its predetermined maximum torque transmitting value as will now be readily apparent. The closing of the contact 2RS1 has energized the wrench solenoid WS through a circuit extending through the wire 206, solenoid WS, wire 197, contact 2RS1, and wires 199 and 200 thereby preventing improper operation of the power chuck wrench.

While the spindle 58 is rotating at full speed in the reverse direction, the movable contact of the plugging switch 3PS will have moved into engagement with the stationary contact 216 thereof so that the relay 2RR is now energized. This circuit extends through the wires 200, 199, the now closed contact 2RS1, wire 198, the movable contact of plugging switch 3PS, contact 216, wire 217, and the coil of relay 2RR to and through the wires 205, 206 thereby energizing the 2RR relay which causes it to close its normally open contact 2RR1 and 2RR2. Closing of the contact 2RR1 provides a holding circuit therethrough and through a wire 218 connected with the wire 198 and thence through the plugging switch 3PS, wire 217 and the coil of relay 2RR to the wires 205 and 206. The closing of the contact 2RR2 prepares a circuit for energization of the forward clutch 145 which circuit is at present open at contact 2RS2 as will be presently described.

The holding circuit provided for the 2RR coil through the 2RR1 contact maintains the 2RR relay energized when the lever 164 is moved from engagement with the 2RS switch in stopping the spindle 58. The release of the switch 2RS does however deenergize the coil 157 of the reverse clutch 154 since the contact 2RS3 is opened. The closing of the contact 2RS2 now completes the above-mentioned circuit to the forward clutch through the 2RR2 contact. This circuit extends from the rectifier 110, through the wire 190, wire 191, resistances 192, 193, in series, wires 194 and 219, to and through the contact 2RR2 to a wire 220 thence through the now closed contact 2RS2 to and through the forward clutch 147, the circuit being completed through the wire 196 back to the rectifier. This circuit is under control of the plugging switch 3PS since it will be remembered that the contact 2RR2 is held closed only so long as relay 2RR is energized and the holding circuit for this relay extends through the plugging switch 3PS. Consequently, when the spindle 58 stops or substantially stops, the shaft 74 carrying the plugging switch 3PS will likewise have stopped or substantially stopped so that the movable contact thereof will have returned to its central position out of engagement with the contact 216, thus breaking the circuit to the 2RR relay deenergizing the latter so that the contacts 2RR1 and 2RR2 are open. Therefore the circuit through the contact 2RR2 to the forward clutch 147 is broken and the spindle of the machine remains at rest. As before described, the circuit to the wrench solenoid WS will be open since the contact 2RS1 will be open and consequently the chuck wrench may be operated, if desired, during which operation the switch WLS will open preventing energization of the rectifier 110 and hence improper operation of either clutch so long as the chuck wrench spindle is operative in effecting a chucking or unchucking operation. Upon retraction of the chuck spindle to its initial position, switch WLS is closed thus energizing the rectifier 110 and the machine is then ready for a new operation.

In the event the spindle 58 is operating in the reverse direction and it is desired to rotate it in a forward direction, the lever 164 is simply moved from its "Reverse" to its "Forward" position. The operation of the circuit shown in Fig. 17 by which the reverse clutch coil 157 is deenergized and the forward clutch coil 147 is energized under control of the plugging switch 3PS to effect braking of the reverse rotation and thereby momentarily stopping the spindle 58 has just been described. Now, however, the spindle 58 does not remain motionless. Instead, the prior positioning of the lever 164 has actuated the switch 2FS thereby closing the contacts 2FS1 and 2FS2 and opening the contact 2FS3. Consequently, when the plugging switch 3PS opens the circuit through the latter and the contact 2RR2, thereby deenergizing the 2RR relay, the forward clutch 145 will remain energized through a circuit extending from the rectifier 110 through wire 190, 191, resistances 192, 193, wires 194 and 195, through the now closed contact 2FS2, the closed contact 2RS2, to and through the forward clutch coil 147. The forward clutch 145 is therefore now energized to produce forward rotation of the spindle and this is under a gentle start condition since the current to energize the clutch is reduced by both the adjustable resistances 192 and 193. When the speed of the rotation of the spindle has increased to substantially its predetermined maximum value the movable contact of plugging switch 2PS moves into engagement with the stationary contact 201 thereby bridging or short-circuiting the resistance 192 so that the clutch coil 147 is now energized at its maximum preselected value providing the maximum predetermined torque transmitting capacity.

During this interval, the movable contact of the plugging switch 3PS will have its movable contact brought into engagement with the stationary contact 202 thus energizing the forward relay FR in preparation for energization of the reverse clutch coil, when it is desired to stop or reverse the spindle. The circuit thus completed and which energizes the FR relay does not, however, energize the reverse clutch at this time since the circuit to the latter is held open through the contact 2FS3 which is now open. When moving from forward to reverse, the operations are substantially the same as has just been described and hence need not be repeated in detail.

Jogging or "inching" of the wrench spindle in a forward direction is provided for in the embodiment here illustrated by means of the jogging switch generally designated 212. This is a manually operable switch and includes the normally closed contact 212a and the normally open contacts 212b and 212c. When the jog switch 212 is depressed, the corresponding opening of the contact 212a prevents energization of the reverse clutch 154 by opening the previously described circuit therethrough.

Closing of the contact 212b completes a circuit through that contact from the wire 200 to and through the wires 221, 207, 198 and 197, and thence through the wrench solenoid WS to the wire 206 thereby energizing the wrench solenoid preventing operation of the chuck wrench while the inching or jogging is occurring. Closing of the contact 212c completes a circuit from the rectifier 110 through the wires 190, 191, resistances 192, 193, to and through a wire 222 to the contact 212c and through the latter and wires 223, 220 to the normally closed contact 2RS2 and thence through the forward clutch coil 147, the circuit being completed back to the rectifier through the wire 196. Consequently, the forward clutch coil 147 is energized for reduced torque operation of the clutch as long as the jogging switch 212 is held operated, the energization of the forward clutch coil and of the solenoid WS being released as soon as the jogging switch is released.

A still different embodiment of the invention will now be described with reference to Figs. 18 and 19. In this embodiment, a forward and reverse clutch are employed and are assembled with the main drive pulley 32 in the same manner as shown in Fig. 14, the connections of the pulley to the shaft 33 and the forward gear 160, or to the reverse gear 159, being effected as previously described. The present embodiment, however, employs but a single plugging switch 4PS which is connected with the shaft 74 similar to the switch 1PS in Fig. 10. The control lever 164 is the same as has been previously described for the embodiment shown in Figs. 14 to 17 but now cooperates with three switches, namely: 3FS, corresponding with the position of the control lever for forward rotation of the spindle; 3RS, corresponding with the position of the lever for reverse rotation of the spindle; and 1SS, corresponding with the position of the lever for stopping or non-rotation of the spindle. The operation of this embodiment of the invention is similar to that which has been described with respect to Fig. 17 with the primary difference being that the automatic shifting from low to maximum torque transmitting capacity of the reverse and forward clutches is now under control of timing relays rather than a plugging switch.

Referring now to Fig. 19, it will be seen that three-phase alternating electrical current is supplied to the apparatus through the power lines L1, L2 and L3 with the lines L1 and L3 connected to the primary 104 of a transformer T, the secondary 105 of which provides current for the control circuit. As in the previous embodiment, a motor starter M is connected with the transformer secondary 105 through the manual start switch 111 and stop switch 112, the motor starter M having four normally open contacts M1, M2, M3 and M4. The circuit is the same as previously described for the other embodiments and hence it will now be apparent that actuation of the start switch 111 energizes the motor relay M to close the contacts M1, M2 and M3 thereby connecting the main motor 30 with the power supply lines L1, L2 and L3, the M4 contact by its closing providing a holding circuit for the relay or starter M.

The instant embodiment of the invention likewise includes a rapid traverse motor 168 for idle movement of the slide or slides of the machine tool, energization of this motor being under control of a motor starter or relay RT connected in parallel with the motor starter M and hence under control of the start switch 111 and stop switch 112 in the same manner. The motor starter or relay RT includes three normally open contacts RT1, RT2 and RT3, which close when the relay is energized to connect the motor 168 with the power supply lines L1, L2 and L3. It will be evident that the motors 30 and 168, when once energized, will remain in operation regardless of whether or not the clutches 145 and 154 are energized or deenergized, the motors being stopped when desired by operation of the stop switch 112.

As in the embodiment described with respect to the diagram in Fig. 17, the instant form of the invention includes a rectifier 110, the input of which is connected with the secondary 105 of the transformer T through the switch WLS, which is normally closed but is opened by the abutment or arm 103 when the power chuck wrench shown in Fig. 20 is operated to engage with the socket 93 of the chuck. When the chuck wrench spindle is withdrawn from the socket 93 of the chuck, the switch WLS is closed thereby providing an interlock preventing improper simultaneous operation of the clutches and the chuck wrench.

Let it be assumed that it is desired to operate the apparatus in the forward direction. The control lever 164 is then moved to engage switch 3FS. When thus positioned, the contact 3FS1 of the switch is closed and the contact 3FS2 thereof is open. Closing of the contact 3FS1 completes a circuit from the rectifier 110 through a wire 224 to and through the variable resistances 225 and 226, in series, to a wire 227 thence to and through the now closed contact 3FS1 and the normally closed contact 3RS1 of the switch 3RS to and through the coil 147 of the forward clutch, the circuit being completed from the latter through the wire 228 returning to the rectifier 110. The forward clutch 145 is therefore energized to provide a gentle start under reduced torque transmitting capacity, the value of which is determined by the setting of the adjustable resistances 225 and 226.

A timing relay 1STD is energized simultaneously with the energization of the forward clutch by virtue of the movement of the lever 164. This follows from the fact that the 1SS switch is held open when the control lever is in stop position and hence the movement of the lever 164 to the "Forward" position has caused the contacts 1SS1 and 1SS2 of switch 1SS to close. Therefore, a circuit was initially provided from the transformer secondary 105 through the wires 229, 230 and 231 to and through the now closed contact 1SS1 to a wire 232 and thence through the coil of the relay 1STD back to the other side of the secondary of the transformer T through the wires 233, 234 and 235. The contact 1STD1 of relay 1STD does not, however, immediately close this relay is of the time delay type, the time interval of which is so selected that the contact 1STD1 moves to circuit closing position after the spindle 58 is rotating at substantially full speed.

Simultaneous with the energization of the 1STD relay, a circuit is also completed through the 1SS1 contact of switch 1SS and the normally closed contact 1RTD1 of a relay 1RTD to a wire 236, which is connected with the coil of a relay RTR, the circuit being completed back to the transformer T by the wires 237, 233, 234 and 235. Energization of relay RTR closes its contacts RTR1, RTR2, with contact RTR1 providing a holding circuit from the wire 232 through this contact to the wire 236 and thence through the coil of the relay thereby maintaining the relay energized upon opening of the contact 1RTD1 which occurs substantially simultaneously since the relay 1RTD is also energized through a circuit extending through the 1RTD1 contact, wire 236, wire 238, and the coil of relay 1RTD to a wire 239 which is connected back to the transformer through the wires 237, 233, 234 and 235. Therefore, the substantially immediate opening of the contact 1RTD1 does not deenergize the relay 1RTD or the relay RTR since the energization of these two relays remains under control of the contact RTR1.

The contact RTR2 is connected in series with the contact 1STD1 of the time delay relay 1STD to provide a by-pass or bridge about the resistance 225, this circuit extending from the wire 224 through the wire 240, contact 1STD1, wire 241, contact RTR2, and wire 242, to a connection between the resistances 225 and 226. This parallel or bridging circuit about the resistance 225 is under control of the time delay relay 1STD since the contact RTR2 closes substantially immediately upon initial actuation of the control lever 164 while the contact 1STD1 does not close until the predetermined time for which the relay has been set and which time corresponds with the interval necessary to bring the machine spindle 58 from stop to substantially full speed. Upon closing of the contact 1STD1, the resistance 225 is therefore by-passed or short-circuited so that the forward clutch 145 is energized at substantially its full or maximum torque transmitting capacity which is determined by the setting of the resistance 226.

While the spindle 58 is thus rotating at substantially full speed, the movable contact of plugging switch 4PS will have moved into engagement with the stationary contact 243 thereby completing a circuit from the transformer T through the wires 229, 230, 231, contact 1SS2 of switch 1SS, and wires 244, 245 to contact 243 through the movable contact of the plugging switch 4PS and thence through a wire 246 to one side of the coil of relay 1FR, this circuit being completed through the relay coil to the wire 234 and thence back to the other side of the transformer T by means of the wire 235. Hence, the relay 1FR is energized closing its normally open contacts 1FR1 and 1FR2. Closing of the contact 1FR1 provides a holding circuit from the wire 229 through the wire 247, contact 1FR1, wires 248 and 249 to the wire 245 and thence through the plugging switch 4PS and the coil of the relay 1FR back to the transformer, as previously described. Therefore, the energization of the relay 1FR remains energized under control of plugging switch 4PS when the circuit through the 1SS2 contact is subsequently opened at the time it is desired to stop or reverse the spindle. The closing of the 1FR2 contact does not effect any operation at this time, since the circuit through the latter to the reverse clutch is held open at the now open 2FS2 contact so that the reverse clutch cannot now be energized.

When it is desired to stop rotation of the spindle 58, the control lever 164 is moved to its "Stop" position thus engaging the switch 1SS and thereby opening its contacts 1SS1 and 1SS2. Likewise, the movement of the control lever has opened the 3FS1 contact and closed the 3FS2 contact. The opening of the 1SS1 contact deenergizes the 1STD relay, the 1RTD relay and the RTR relays. Hence, the contact 1STD1 opens, breaking the by-pass circuit about the resistance 225 so that the latter is again placed in the energizing circuit for the clutches. The contacts RTR1 and RTR2 are also opened but the contact 1RTD1 does not immediately close since the 1RTD relay is a settable time delay relay which delays closing of its contact for preselected time after deenergization of the coil thereof.

The above-mentioned movement of the control lever 164 has deenergized the forward clutch 145 by opening the circuit thereto through the contact 3FS1. In addition, the closing of contact 3FS2 of switch 3FS as the result of movement of the control lever completes a circuit therethrough under control of the plugging switch 4PS for energization of the reverse clutch 154 to effect braking of the rotation of the spindle 58. This last-mentioned circuit extends from the rectifier 110 through the resistance 225, 226 in series since, as mentioned before, the by-pass of the 225 resistance has been removed, through the wires 227, 250 and 251 to and through the normally closed contacts 252c of a jog switch 252, the circuit continuing through a wire 253, the now closed contact 3FS2, a wire 254, the now closed contact 1FR2, and a wire 255 to and through the coil 157 of the reverse clutch, the circuit being completed back to the rectifier through the wire 228. Therefore, the reverse clutch 154 is now energized through both the resistances 225 and 226, so that this clutch applies a braking force through the gear train to the spindle 58, slowing the latter to substantially a stop. When this condition is reached, the movable contact of the plugging switch 4PS has moved from engagement with the stationary contact 243 thus deenergizing the relay 1FR so that the latter opens its contacts thereby breaking the holding circuit for the relay and also the circuit to the reverse clutch 154.

During the previously described operation the wrench solenoid WS was energized through a circuit extending from the transformer T through the wires 235, 234, the wrench solenoid WS, wires 257, 258, 248, 249, 244 to and through the closed contact 1SS2 and thence back to the transformer T through wires 231, 230 and 229. The wrench solenoid functions, as previously described for the other embodiments, to prevent actuation of the chuck wrench spindle while the clutches are energized. However, when the lever 164 has been returned to its initial or "Stop" position the switch 1SS has its contact 1SS2 open thereby deenergizing the wrench solenoid WS so that the chuck wrench may now be utilized as has been heretofore described.

Let it now be assumed that it is desired to rotate the spindle 58 in the reverse direction. The lever 164 is then moved to the broken line position marked "Rev." in Fig. 18, which causes the contacts 1SS1 and 1SS2 of switch 1SS to close, the contact 3RS1 to open and the contact 3RS2 to close. Opening of the contact 3RS1 opens the circuit therethrough to the forward clutch 145 thus preventing inadvertent improper operation of the latter. Closing of the contact 3RS2 completes a circuit therethrough to the reverse clutch coil 157 which circuit extends from the rectifier 110 through the wire 224, the variable resistances 225, 226, wires 227, 250, 251, the normally closed contact 252c of the jog switch 252, wire 253 and the closed contact 3FS2 of the switch 3FS to and through the now closed contact 3RS2 to the coil 157 of the reverse clutch, the circuit being completed through the latter to the rectifier 110 by the wire 228. Consequently, the reverse clutch 154 is now energized under reduced torque transmitting capacity and begins the rotation of the machine spindle 58 in a gentle manner.

Simultaneously with the energization of the reverse clutch coil 157, a circuit was completed from the transformer T through the wires 229, 230, 231, contact 1SS1, wire 232 and the coil of the relay 1STD to the wires 233, 234 and 235 back to the transformer T. This energizes the relay 1STD but the latter does not immediately close its contact 1STD1 in the bridging circuit about the resistance 225 since, as mentioned heretofore, the relay 1STD is a time delay relay, the time interval of which is settable and is selected so that the contact 1STD1 does not close until after the elapse of time sufficient to bring the spindle 58 up to substantially its full speed. In addition to the above circuit, the closing of the contact 1SS1 has completed a circuit through the wire 232 to and through the normally closed contact 1RTD1 to the wire 236 thence through the latter and a wire 238 to and through the coils of the relay RTR and 1RTD in parallel, these circuits being completed from the said coils back to the transformer T through the wires 237, 239, 233, 234 and 235. Consequently, the relays RTR and 1RTD are both energized so that, although the contact 1RTD1 opens, the relays RTR and 1RTD remain energized through the holding circuit provided through the RTR1 contact as was previously explained in connection with rotation of the spindle 58 in the forward direction. Also, as above described, the closing of the RTR2 contact has prepared a circuit for bridging or by-passing the resistance 225 which circuit extends from the wire 224 through the wire 240 to the contact 1STD1 of the 1STD relay, the circuit being initially held open at this point, as mentioned above, but which circuit continues through the wire 241, the now closed contact RTR2 and wire 242, to a point intermediate the resistances 225 and 226. Consequently, when the predetermined time interval for which the time relay 1STD is set has elapsed the said relay will close its contact 1STD thereby completing the just mentioned circuit bridging or by-passing the resistance 225 so that the reverse clutch coil 157 is energized to provide the maximum torque transmitting capacity of the clutch as determined by the setting of the resistance 226, until the control lever 164 is again operated.

In addition to the above circuits, the positioning of the control lever 164 into engagement with the 3RS switch has completed a circuit for energization of the wrench solenoid WS through the contact 1SS2, this circuit extending from the transformer through the wires 229, 230, 231, contact 1SS2, wires 244, 249, 248, 258, 257, the solenoid WS, and wires 234 and 235 back to the transformer T. Also the closing of the contact 1SS2 has prepared a circuit through the latter and the plugging switch 4PS for energization of the reverse relay 3RR. This circuit extends from the switch contact 1SS2 through wires 244, 245, plugging switch 4PS, the movable contact of which is now in engagement with its stationary contact 259, and a wire 260 to one side of the coil of relay 3RR, the circuit being completed from the other side of the relay coil through wires 261, 234 and 235. Therefore, the relay 3RR is energized closing its contacts 3RR1 and 3RR2. Closing of the contacts 3RR1 provides a holding circuit therethrough for the relay under the control of the plugging switch 4PS. This holding circuit extends through the wires 229, 230, contact 3RR1, wires 249 and 245, plugging switch 4PS, wire 260 to the coil of the relay 3RR and thence through the previously mentioned wires 261, 234 and 235. Closing of the contact 3RR2 prepares a circuit for energization of the forward clutch coil 147 which circuit is, however, not completed at this time since it is held open at the contact 3RS1 so long as the switch 164 is in engagement with the switch 3RS.

If it now be desired to stop the machine, the control lever 164 is moved into engagement with the switch 1SS. This opens the contacts 1SS1, 1SS2 and the movement of the lever has also closed the contact 3RS1 and opened the contact 3RS2 of the switch 3RS. Opening of the contact 3RS2 has opened the circuit previously described through which the reverse clutch coil 157 was energized. Opening of the switch contact 1SS1 has broken the circuit to the timing relay 1STD so that the latter is deenergized and its contact 1STD1 opens. This therefore breaks the circuit bridged around the resistance 225 and in addition breaks the energizing circuit for the 1RTD and the RTR relays. The closing of the contact 3RS2 now completes a circuit from the rectifier through the wire 224, the resistances 225, 226, wires 227, 250 and 262 to and through the now closed contact 3RR2 to wires 263 and 264 and thence through the now closed contact 3RS1, the circuit being completed through the forward clutch coil 147 to the wire 228 connected with the other side of the rectifier 110. Therefore, the forward clutch 145 is energized under control of the plugging switch 4PS, since the latter controls the relay 3RR, to provide a braking action.

When the rotation of the spindle 58 and hence the intermediate shaft 74 have ceased or substantially ceased, the plugging switch 4PS opens the circuit therethrough by which the relay 3RR was energized. Consequently, the contact 3RR1 providing a holding circuit for this relay will be opened and contact 3RR2, effecting energization of the forward clutch, likewise will open. The operation of the control lever has also opened the circuit through the contact 1SS2 to the wrench solenoid WS so that the latter is energized permitting the power chuck wrench to be employed as previously described.

If it be desired to go from a forward rotation of the spindle to a reverse rotation without pausing at the stop position, this may be readily effected by simply throwing the control lever 164 from the "Forward" to the "Reverse" position. When the lever 164 was in the "Forward" position, the circuit previously described for forward rotation will have been established so that the spindle 58 is rotating in the forward direction energized for its maximum torque transmitting capacity and the plugging switch 4PS will have its movable contact engaged with the stationary contact 243 to prepare the circuit for stopping and reverse rotation. Likewise, the time delay relay 1STD will have been energized and remained energized, so that its contact 1STD bridges the resistance 225, relays 1RTD and RTR also being energized as previously described. As the control lever 164 is now moved from its "Forward" to its "Reverse" position, the initial part of its movement releases the switch 3FS, thereby causing contact 3FS1 to open, deenergizing the forward clutch coil 147, while the simultaneous closing of the contact 3FS2 completes a circuit to the reverse clutch coil 157.

This latter circuit extends through the contact 1FR2, which is now closed, under control of the plugging switch 4PS since it will be remembered that during the time the lever 146 engaged the 3FS switch, the SS1 and SS2 contacts of the SS switch were closed thereby energizing the forward relay FR through the plugging switch 4PS, as was previously described. The resulting energization of the FR relay closed its contacts so that a holding circuit therefor was provided through the 1FR1 contact and the plugging switch 4PS while the 1FR2 contact of relay 1FR prepared the circuit to the reverse clutch coil 157 and which circuit is now completed when the lever 164 is moved from the forward position, thereby closing the contact 3FS2. Consequently, the reverse clutch is energized through the resistances 225, 226 in series under control of the plugging switch and thereby acts as a brake to reduce the speed and substantially stop rotation of the spindle 58.

Since the movement of the lever 164 from its "Forward" to its "Reverse" position is normally faster than the spindle speed can be reduced to substantially zero and before reverse rotation begins, there is the possibility that, as the operator passes through the stop position of the switch 164, the consequent opening of the 1SS switch contacts and immediate reclosing as the lever is moved past this switch would deenergize and reenergize the 1STD relay so rapidly that it would not have time to open its 1STD1 contact in the bridging circuit about the resistance 225. Such an undesirable possibility is prevented by the provision of the relays 1RTD and RTR. The relay 1RTD is of the time delay type which closes its contact a predetermined time after the relay is deenergized. Consequently, when the circuit energizing the 1RTD and the RTR relays through the contact 1SS1 is momentarily broken by the movement of the control lever 164 through the stop position, the RTR and the 1RTD relays are deenergized but are not immediately reenergized when the contact 1SS1 again closes. This is due to the fact that the RTR1 contact opens immediately when the RTR relay is deenergized and which contact provided the holding circuit for the 1RTD and the RTR relays under control of the 1SS1 contact. Therefore, if the holding circuit is broken by opening of the 1SS1 contact and then this contact recloses, the circuit through the relay coils 1RTD and RTR cannot be reestablished immediately since the contact 1RTD1 stays open for a predetermined period of time. Therefore, the contact RTR2 in the bypass or bridging circuit about the resistance 225 remains open for the predetermined time corresponding with the time delay setting of the relay 1RTD and which time corresponds with the normal length of time to bring spindle 58 from full speed forward rotation to substantially a stop. Therefore, even though the 1STD contact is closed, the circuit around the resistance 225 remains open for the predetermined time period.

The spindle 58 does not remain at rest but immediately begins rotating in the reverse direction, as soon as the reverse clutch has overcome the forward rotation, since the reverse clutch coil 157 remains energized due to the fact that the control lever 164 has been moved into engagement with the 3RS switch, thus closing the 3RS2 contact which is in parallel about the 1FR2 contact. Consequently, when the rotation of the spindle is substantially zero, at the interval of reversal of direction of rotation of the spindle 58, and the plugging switch 4PS opens the circuit through the relay 1FR, the circuit to the reverse clutch coil 157 remains closed as just mentioned, so that the spindle begins its reverse rotation under reduced torque transmitting capacity as determined by the settings of the resistances 225 and 226. As the speed of rotation of the spindle 58 increases in the reverse direction, the circuit operates as above described to short-circuit or by-pass the resistance 225 through the operation of the time delay relay 1STD so that the reverse clutch coil 157 is now energized to provide its maximum permissible torque transmitting capacity as determined by the setting of the resistance 226. During this period of time the plugging switch 4PS will have also reset itself, providing a circuit therethrough and the now closed contact 1SS2 to the reverse relay 3RR energizing the latter so that a circuit is prepared for stopping under the braking action of the forward clutch coil 147 whenever the control lever 164 is moved from its reverse position.

Similar operations of the various portions of the circuit are effected when the lever initially is positioned in its "Reverse" position and is then thrown to its "Forward" position and since these operations are readily apparent in view of those just described, they need not be here set forth.

The presently described embodiment is likewise provided with means for effecting a jogging or inching of the machine spindle 58 in the forward direction under control of a manually operable jogging switch 252. This switch is provided with three normally open contacts 252a, 252b, 252d and a normally closed contact 252c. When the jog switch 252 is held depressed a circuit is completed from the rectifier 110 through the wire 224, resistances 225, 226, wires 227, 250, 251 and 265, through the now closed contact 252a to wire 266, then to wire 264 and thence through now closed contact 3RS1 to the forward clutch coil 147, the circuit being completed through the wire 228 back to the rectifier 110. Consequently, the forward clutch coil 147 is energized for rotation under reduced torque transmitting capacity and continues to effect rotation of the spindle so long as the jog switch 252 is held closed. In addition to the above mentioned circuit, the jog switch 252 when operated opens its contact 252c, thereby preventing energization of the reverse clutch coil 157 as will be readily apparent. The closing of the contact 252b closes a circuit in parallel about the contact 1SS1 so that if the switch 252 should be held operated for an appreciable length of time, greater than the time interval of the time delay 1STD, the resistance 225 will be automatically by-passed as has been previously described.

In addition, the closing of the contact 252d of switch 252 has provided a bridging circuit about the switch contact 1SS2 thereby energizing the wrench solenoid WS so that the chuck wrench cannot be improperly used while the jog switch is depressed. It will also be remembered that the wrench limit switch WLS is in the energizing circuit for the rectifier 110 so that, in the event the chuck wrench spindle 92 has been left engaged with the chuck, inching or jogging cannot be effected when the switch 252 is depressed because no current will be supplied to the clutch coil 147.

It will now be apparent that each of the several embodiments of the invention provide novel clutching and braking action by use of variable torque electromagnetic means so controlled that the total maximum torque transmission may be readily adjusted. Moreover, the driven member, namely, the spindle of the machine tool may be gently brought into rotation without excessive damage or wear to the clutch elements, this being true whether the spindle is being initially placed in rotation or its direction of rotation reversed from that in which it was previously rotating and without any appreciable stop therebetween. Furthermore, means are provided in each embodiment of the invention to automatically remove a resistance from the energization circuit of the electromagnetic means through a delayed acting mechanism so that the electromagnetic means is initially energized for reduced torque transmitting capacity which is increased to maximum predetermined torque transmitting capacity only when the spindle has reached substantially its full speed. In certain embodiments the length of the interval of reduced torque transmitting capacity is determined by the speed of a shaft correlated with the speed of the spindle, while in other embodiments this interval is determined by a timing mechanism independent of the shaft or spindle speed. In addition, the several embodiments of this invention provide the above-mentioned features in a compact organization which does not increase the present size of the drive pulley or the headstock adjacent thereto. Finally, the several embodiments of this invention are so constructed and arranged that control of the forward, reverse, and/or braking of the machine spindle is easily and readily effected through the operation of a single control lever, an automatic interlock also being provided to prevent improper energization of the rotational clutches when a power chuck wrench is engaged or partially moved for engagement with the chuck on the spindle. Conversely, the power chuck wrench of the machine tool cannot be utilized when a clutch is energized for rotation.

While a number of different embodiments of the invention have been illustrated and described in detail, it will be readily apparent that other embodiments of the invention will be readily effected by those skilled in the art after having had the benefit of this disclosure. Likewise, modifications and adaptations of the disclosed embodiments will be readily suggested, and consequently the illustrated and described constructions are intended to be illustrative only and are not intended as limitations on the invention except as required by the spirit and scope of the appended claims.

Having thus described the invention, I claim:

1. A power drive for a machine tool comprising a rotatable driving member, a rotatable driven member, a variable torque electromagnetic clutch intermediate said members and adapted when energized to establish driving relationship therebetween, and means to control the energization of said clutch including a source of electrical energy, a resistance, means effecting interconnection of said resistance between said source of energy and said clutch upon initial energization of said clutch to thereby limit the torque transmitting capacity of said clutch, delayed acting means including a movable contact automatically operated subsequent to the commencement of rotation of said driven member and maintained operated during the continued energization of said clutch, and means connecting said movable contact in parallel with said resistance in a manner such that the said operation of the contact short circuits said resistance thereby increasing the torque transmitting capacity of said clutch, whereby excessive starting torques on said clutch are prevented.

2. A power drive for a machine tool as defined in claim 1 wherein the said delayed acting means comprises a time delay relay, and the said means effecting interconnection of said resistance with the source of electrical energy includes means controlling energization of said relay.

3. A power drive for a machine tool as defined in claim 1 wherein the said delayed acting means comprises a speed responsive switch operatively connected with said driven member in a manner such that the said contact is moved to circuit closing position when said driven member is rotating at substantially a predetermined speed.

4. A power drive for a machine tool comprising a rotatable driving member, a rotatable driven member, a variable torque electromagnetic clutch intermediate said members and adapted when energized to establish driving relationship therebetween, and means to control the energization of said clutch including a source of electrical energy, a variable resistance, means effecting interconnection of said resistance between said source of energy and said clutch upon initial energization of said clutch to thereby limit the torque transmitting capacity of said clutch to a value determined by the setting of said variable resistance, delayed acting means including a movable contact automatically operated subsequent to the commencement of rotation of said driven member and maintained operated during the continued energization of said clutch, and means connecting said movable contact in parallel with said resistance in a manner such that the said operation of the contact short circuits said resistance thereby increasing the torque transmitting capacity of said clutch, whereby excessive starting torques on said clutch are prevented.

5. A power drive for a machine tool comprising a rotatable driving member, a rotatable driven member, a variable torque electromagnetic clutch intermediate said members and adapted when energized to establish a driving relationship therebetween, and means to control the energization of said clutch including a source of electrical energy, two electrical resistances, means effecting interconnection of said resistances in series between said source of energy and said clutch upon initial energization of said clutch to thereby limit the torque transmitting capacity of said clutch, delayed acting means including a movable contact automatically operated subsequent to the commencement of rotation of said driven member and maintained operated during the continued energization of said clutch, and means connecting said movable contact in parallel with one of said resistances such that operation of the contact short circuits said one resistance thereby increasing the torque transmitting capacity of said clutch, whereby excessive starting torques on said clutch are prevented.

6. A power drive for a machine tool as defined in claim 5 and wherein the resistance remaining in series with said clutch is adjustable to regulate the maximum torque transmitting capacity of said clutch.

7. A power drive for a machine tool as defined in claim 5 and wherein both of said resistances are adjustable to thereby regulate both the starting torque and the maximum torque transmitting capacities of said clutch.

8. A power drive for a machine tool comprising a rotatable driving member, a rotatable driven member, a variable torque electromagnetic clutch intermediate said members and adapted to establish driving relationship therebetween when energized, electromagnetic means operatively associated with said driven member to exert a braking action thereon when energized, a source of electrical energy, a resistance, means for effecting interconnection of said resistance between said source of energy and said clutch to thereby energize said clutch and limit the initial torque transmitting capacity thereof, delayed acting means including a movable contact automatically operated subsequent to the commencement of rotation of said driven member and maintained operated during the continued energization of said clutch, means connecting said movable contact in parallel with said resistance in a manner such that the operation of the contact short circuits said resistance thereby increasing the torque transmitting capacity of said clutch, means for effecting interconnection of said electromagnetic means with said source of energy to effect said braking action, and a single manually operated control member for selective actuation of the means for effecting said interconnections.

9. A power drive for a machine tool comprising a rotatably mounted shaft, a drive pulley rotatably mounted on said shaft, a variable torque electromagnetic clutch including an annular armature and an energizing coil disposed substantially within the confines of said pulley and adapted when energized to establish a driving relationship between said pulley and shaft, means to control the energization of said coil including a source of electrical energy, a resistance, means effecting interconnection of said resistance between said source of energy and said coil to thereby limit the torque transmitting capacity of said clutch to a value determined by said resistance, delayed acting means including a movable contact automatically operated subsequent to the commencement of rotation of said shaft and maintained operated during the continued energization of said coil, and means connecting said movable contact in parallel with said resistance in a manner such that the said operation of the contact short circuits said resistance thereby increasing the torque transmitting capacity of said clutch, whereby excessive starting torques on said clutch are prevented.

10. A power drive as defined in claim 9 and further comprising an electromagnetic brake operatively associated with said shaft adjacent said pulley, means for effecting an interconnection of said brake with said source of energy, and a single manual control member for selective actuation of the said means for effecting said interconnections.

11. A power drive for a machine tool spindle comprising a rotatable driving member, a rotatable driven member, an electromagnetic clutch intermediate said members and cooperating therewith to provide a driving relationship therebetween when energized, means controlling energization of said clutch including mechanically actuated switch means, a gear train between said driven member and said spindle including separate clutches adapted to selectively connect said driven member in said gear train for rotation of said spindle in either a forward or reverse direction, a single control lever operatively connected with said separate clutches for alternate selective engagement thereof when moved to opposite extreme position and means on said lever cooperating with said switch means to operate the latter, whereby said electromagnetic clutch is automatically deenergized and reenergized whenever said lever is moved from one extreme position to the other for effecting disengagement of either one of said separate clutches and engagement of the other one thereof.

12. A power drive as defined in claim 11 wherein the said control lever includes two parts with one of said parts adapted to actuate the said switch means and the other of said parts connected for actuation of said separate clutches, and means providing a lost motion connection between said parts whereby said electromagnetic clutch may be selectively energized and deenergized without altering the respective engagement and disengagement of said separate clutches.

13. A power drive for a machine tool spindle comprising a rotatable driving member, a rotatable driven member, an electromagnetic clutch intermediate said members and cooperating therewith to provide a driving relationship therebetween when energized, an electromagnetic brake operatively associated with said driven member, means controlling alternate energization of said clutch and brake including mechanically actuated switch means, a gear train between said driven member and said spindle including separate clutches adapted to selectively connect said driven member in said gear train for rotation of said spindle in either a forward or reverse direction, a single control lever operatively connected with said separate clutches for alternate selective engagement thereof when moved to opposite extreme positions, and means on said lever cooperating with said switch means to operate the latter, whereby said electromagnetic clutch is automatically momentarily deenergized and the brake momentarily energized whenever said lever is moved from one extreme position to the other for effecting disengagement of either one of said separate clutches and engagement of the other one thereof.

14. A power drive as defined in claim 13 wherein the said control lever includes two parts with one of said parts adapted to actuate said switch means and the other of said parts connected for actuation of said separate clutches, and means providing a lost motion connection between said parts whereby said electromagnetic clutch and brake may be alternately selectively energized and deenergized for controlling rotation of said spindle in a given direction without altering the respective engagement and disengagement of said separate clutches.

15. A power drive for a machine tool as defined in claim 13 and further comprising an electrical resistance connected in series with said electromagnetic clutch, and delayed acting means automatically short circuiting said resistance subsequent to each energization of said electromagnetic clutch whereby the torque transmitting capacity of said electromagnetic clutch is reduced below its maximum value whenever said control lever is actuated to energize said electromagnetic clutch.

16. A power drive as defined in claim 15 wherein the said delayed acting means comprises a time delay relay including a normally open contact connected in parallel about said resistance, and the said means controlling alternate energization of said electromagnetic clutch and brake includes means controlling energization of said relay.

17. A power drive as defined in claim 15 wherein the said delayed acting means comprises a speed responsive switch operatively connected with said driven member and including a normally open contact connected in parallel about said resistance, the said contact moving to circuit closing position when said spindle is rotating at substantially a predetermined speed.

18. A power drive for a machine tool comprising a rotatable driving member, a pair of rotatable driven members, a separate variable torque electromagnetic clutch intermediate each of said driven members and said driving member adapted to selectively establish a driving relationship between the corresponding driven member and said driving member, a source of electrical energy, means to selectively establish a connection from said source of energy to a selected one of said clutches including a resistance and switch means connecting said resistance in series with the said selected clutch thereby limiting the initial torque transmitting capacity of that clutch, delayed acting means including a movable contact automatically operated subsequent to the commencement of rotation of the driven member whose clutch is energized and maintained operated during the continued energization of the energized clutch, and means connecting said movable contact in parallel with said resistance in a manner such that the said operation of the contact short circuits said resistance thereby increasing the torque transmitting capacity of the energized clutch whereby excessive starting torques on said clutches are prevented.

19. A power drive for a machine tool as defined in claim 18 and wherein the said resistance is variable to thereby adjust the initial torque transmitting capacity of said clutch.

20. A power drive for a machine tool as defined in claim 18 wherein the said delayed acting means comprises a time delay relay, and means energizing said relay when either of said clutches is energized.

21. A power drive for a machine tool as defined in claim 18 wherein the said delayed acting means comprises a speed responsive switch operatively connected with said driven members to respond to the speed thereof in a manner such that the said contact is moved to circuit closing position when the driven member corresponding with the energized clutch is rotating at substantially a predetermined speed.

22. A power drive as defined in claim 18 and further comprising an electromagnetic brake operatively associated with said driven members, and means connecting said brake with said source of electrical energy including switch means preventing such connection when either of said clutches is energized.

23. A power drive for a machine tool comprising a rotatable driving member, a pair of rotatable driven members, a separate variable torque electromagnetic clutch intermediate each of said driven members and said driving member adapted to selectively establish a driving relationship between the corresponding driven member and said driving member, a source of electrical energy, means to selectively establish a connection from said source of energy to a selected one of said clutches including switch means and a separate resistance for each clutch adapted to be connected in series with its clutch by said switch means to thereby limit the initial torque transmitting capacity of that clutch, delayed acting means including movable contact means automatically operated subsequent to the commencement of rotation of the driven member whose clutch is energized and maintained operated during the continued energization of that clutch, and means connecting the movable contact means in parallel with the said resistance for the energized clutch in a manner such that operation of the contact means short circuits that resistance thereby increasing the torque transmitting capacity of that clutch whereby excessive starting torques on said clutches are prevented.

24. A power drive for a machine tool comprising a rotatable driving member, a pair of rotatable driven members, a separate variable torque electromagnetic clutch intermediate each of said driven members and said driving member adapted to selectively establish a driving relationship between the corresponding driven member and said driving member, a source of electrical energy, means to selectively establish a connection from said source of energy to a selected one of said clutches including two variable electrical resistances and switch means connecting said resistances in series with the said selected clutch thereby limiting the initial torque transmitting capacity of that clutch, delayed acting means including a movable contact automatically operated subsequent to the commencement of rotation of the driven member whose clutch is energized and maintained operated during the continued energization of that clutch, and means connecting the movable contact in parallel with one of said resistances in a manner such that operation of the contact short circuits said one resistance thereby increasing the torque transmitting capacity of the energized clutch whereby excessive starting torques on said clutches are prevented and the maximum torque transmitting capacity of the clutches may be preselected.

25. A power drive as defined in claim 24 and further comprising manually operable jog switch means for effecting energization of one only of said clutches through said resistances while preventing energization of the other of said clutches thereby permitting inching of said driven member.

26. A power drive for a machine tool comprising a rotatable driving member, a pair of rotatable driven members, a separate variable torque electromagnetic clutch intermediate each of said driven members and said driving member adapted to selectively establish a driving relationship between the corresponding driven member and said driving member, a source of electrical energy, means to selectively establish a connection from said source of energy to a selected one of said clutches including a resistance and switch means connecting said resistance in series with the said selected clutch thereby limiting the initial torque transmitting capacity of that clutch, delayed acting means including a movable contact automatically operated subsequent to the commencement of rotation of the driven member whose clutch is energized and maintained operated during the continued energization of the energized clutch, means connecting said movable contact in parallel with said resistance in a manner such that the said operation of the contact short circuits said resistance thereby increasing the torque transmitting capacity of the energized clutch, a speed responsive switch operatively connected for rotation in timed relation with said driven members and having a normally open contact which is closed at speeds above a predetermined value, and means including the last-mentioned contact for energizing the other of said clutches when a previously energized clutch is deenergized to provide a braking action upon the driven member rotated thereby until the speed of the driven member drops below the said predetermined value.

27. A power drive for a shaft of a machine tool comprising a rotatably mounted member connected with a gear for rotating said shaft in one direction, a drive pulley rotatably mounted on said member, a gear freely rotatably mounted on said member for rotating said shaft in the opposite direction, a first variable torque electromagnetic clutch including an annular armature and energizing coil disposed substantially within the confines of said pulley and adapted when energized to establish a driving relationship between said pulley and member, a second variable torque electromagnetic clutch including an annular armature and energizing coil disposed substantially within the confines of said pulley and adapted when energized to establish a driving relationship between said pulley and the second-mentioned gear, a source of electrical energy, and means to selectively control the energization of said clutch coils including switch means effecting interconnection of said source of energy and the selected clutch coil and resistance means to limit the flow of current to the selected coil to thereby initially limit the torque transmitting capacity of the corresponding clutch, delayed acting means including movable contact means automatically operated subsequent to the commencement of rotation of said shaft and maintained operated during the continued energization of the energized coil, and means connecting said movable contact means in parallel with said resistance means in a manner such that the operation of the said contact means short circuits the said resistance means and thus increases the torque transmitting capacity of the energized clutch, whereby excessive starting torques on said clutches are prevented.

28. A power drive for a machine tool spindle comprising a rotatable driving member, a rotatable driven member operatively connected to said spindle to rotate the latter, clutch means between said driving and driven members selectively operable to provide rotation of said spindle in either direction, the said clutch means including electromagnetic means intermediate said members to establish a variable torque driving relationship therebetween when energized, a source of electrical energy, electrical resistance means, means effecting interconnection of said resistance means between said source of energy and said electromagnetic means whenever the first-mentioned means is actuated to alter the spindle rotation, delayed acting means including normally open contact means automatically operated subsequent to commencement of rotation of said spindle and maintained operated during continued energization of the said electromagnetic means, and means connecting said movable contact means in parallel with said resistance means in a manner such that said operation of the contact means short circuits said resistance means thereby increasing the torque transmitting capacity of said electromagnetic means, whereby excessive torques on said clutch means are prevented when rotation of said spindle is initiated or reversed.

References Cited in the file of this patent

UNITED STATES PATENTS

| Number | Name | Date |
|---|---|---|
| 934,104 | Steckel | Sept. 14, 1909 |
| 1,136,279 | Severy | Apr. 20, 1915 |
| 1,137,804 | Sperry | May 4, 1915 |
| 1,297,236 | Peiler | Mar. 11, 1919 |
| 1,960,815 | Jesson et al. | May 29, 1934 |
| 1,993,413 | Mellon | Mar. 5, 1935 |
| 2,018,720 | Hodgson | Oct. 29, 1935 |
| 2,176,897 | Fodor | Oct. 24, 1939 |
| 2,214,901 | Griffin | Sept. 17, 1940 |
| 2,249,241 | Groene et al. | July 15, 1941 |
| 2,395,772 | Winther | Feb. 26, 1946 |
| 2,466,574 | Bullard | Apr. 5, 1949 |
| 2,473,108 | Meyer et al. | June 14, 1949 |
| 2,484,885 | Hassman | Oct. 18, 1949 |
| 2,493,299 | Le Blond | Jan. 3, 1950 |
| 2,501,286 | Mirossay | Mar. 21, 1950 |
| 2,503,891 | Van Voorhis | Apr. 11, 1950 |
| 2,528,316 | Mayo | Oct. 31, 1950 |
| 2,600,667 | Mason | June 17, 1952 |